United States Patent
Ramirez-Saenz et al.

(10) Patent No.: US 10,852,155 B2
(45) Date of Patent: Dec. 1, 2020

(54) LANGUAGE DENSITY LOCATOR

(71) Applicant: HERE Global B.V., Eindhoven (NL)

(72) Inventors: Sophia Ramirez-Saenz, Chicago, IL (US); Chris Dougherty, Highland Park, IL (US)

(73) Assignee: HERE Global B.V., Eindhoven (NL)

( * ) Notice: Subject to any disclaimer, the term of this patent is extended or adjusted under 35 U.S.C. 154(b) by 123 days.

(21) Appl. No.: 16/266,424

(22) Filed: Feb. 4, 2019

(65) Prior Publication Data
US 2020/0249049 A1 Aug. 6, 2020

(51) Int. Cl.
*G01C 21/36* (2006.01)
*H04W 4/024* (2018.01)
*G06Q 30/02* (2012.01)

(52) U.S. Cl.
CPC ..... *G01C 21/3679* (2013.01); *G06Q 30/0205* (2013.01); *H04W 4/024* (2018.02)

(58) Field of Classification Search
CPC .............. G01C 21/3679; H04W 4/024; G06Q 30/0205
See application file for complete search history.

(56) References Cited

U.S. PATENT DOCUMENTS

| | | | |
|---|---|---|---|
| 8,521,539 B1* | 8/2013 | Teng ................ | G10L 15/30 704/275 |
| 9,049,557 B2 | 6/2015 | Yu | |
| 9,672,818 B2* | 6/2017 | Bradford ............. | G10L 15/18 |
| 9,705,618 B1 | 7/2017 | Poornachandran et al. | |
| 2009/0144609 A1* | 6/2009 | Liang ................. | G06F 40/10 715/230 |
| 2011/0093265 A1* | 4/2011 | Stent ................. | G10L 15/06 704/243 |
| 2011/0137653 A1* | 6/2011 | Ljolje ............... | G10L 15/183 704/255 |
| 2011/0153654 A1* | 6/2011 | Lee .................. | G06F 16/29 707/769 |

(Continued)

OTHER PUBLICATIONS

Perez, Sarah, *Facebook's New "Discover People" Feature Wants to Help You Make Friends*, Feb. 1, 2017, [article, online], [retrieved May 16, 2019], retrieved from the Internet <URL: https://techcrunch.com/2017/02/01/facebooks-new-discover-people-section-wants-to-help-you-make-friends/>, 5 pages.

*Primary Examiner* — Tyler J Lee
(74) *Attorney, Agent, or Firm* — Alston & Bird LLP

(57) ABSTRACT

A network apparatus receives a language request provided by a requesting user apparatus. The network apparatus generates and provides poll requests to responding user apparatuses and receives poll responses from the responding user apparatuses. Each poll response is associated with a language and indicates a current location of the corresponding responding user apparatus. Based on the poll responses, the network apparatus identifies areas or points of interest (POIs) that have a density of poll responses that (a) indicate a current location that corresponds to the area and/or POI and (b) is associated with a particular language. The network apparatus generates and provides a request response comprising information identifying at least one density area and/or POI. The requesting user apparatus receives the request response and provides information regarding the at least one density area and/or POI via an interactive user interface.

20 Claims, 7 Drawing Sheets

(56) References Cited

U.S. PATENT DOCUMENTS

| | | | |
|---|---|---|---|
| 2011/0276689 A1 | 11/2011 | Rosen | |
| 2013/0110509 A1* | 5/2013 | Cath | G10L 15/30 |
| | | | 704/235 |
| 2013/0211814 A1* | 8/2013 | Derks | G06Q 50/12 |
| | | | 704/2 |
| 2014/0201671 A1* | 7/2014 | Zhai | G06F 40/263 |
| | | | 715/773 |
| 2014/0316784 A1 | 10/2014 | Bradford et al. | |
| 2015/0169537 A1* | 6/2015 | Corston | G06F 40/274 |
| | | | 704/9 |
| 2015/0309984 A1* | 10/2015 | Bradford | G06F 40/263 |
| | | | 704/8 |
| 2016/0117329 A1* | 4/2016 | Busey | G06F 16/287 |
| | | | 707/726 |
| 2017/0228786 A1 | 8/2017 | Callahan | |
| 2019/0228073 A1* | 7/2019 | Chatterjee | G06F 40/216 |
| 2020/0004823 A1* | 1/2020 | Chatterjee | G06N 3/08 |
| 2020/0118221 A1* | 4/2020 | Slotkin | G06F 16/24578 |

* cited by examiner

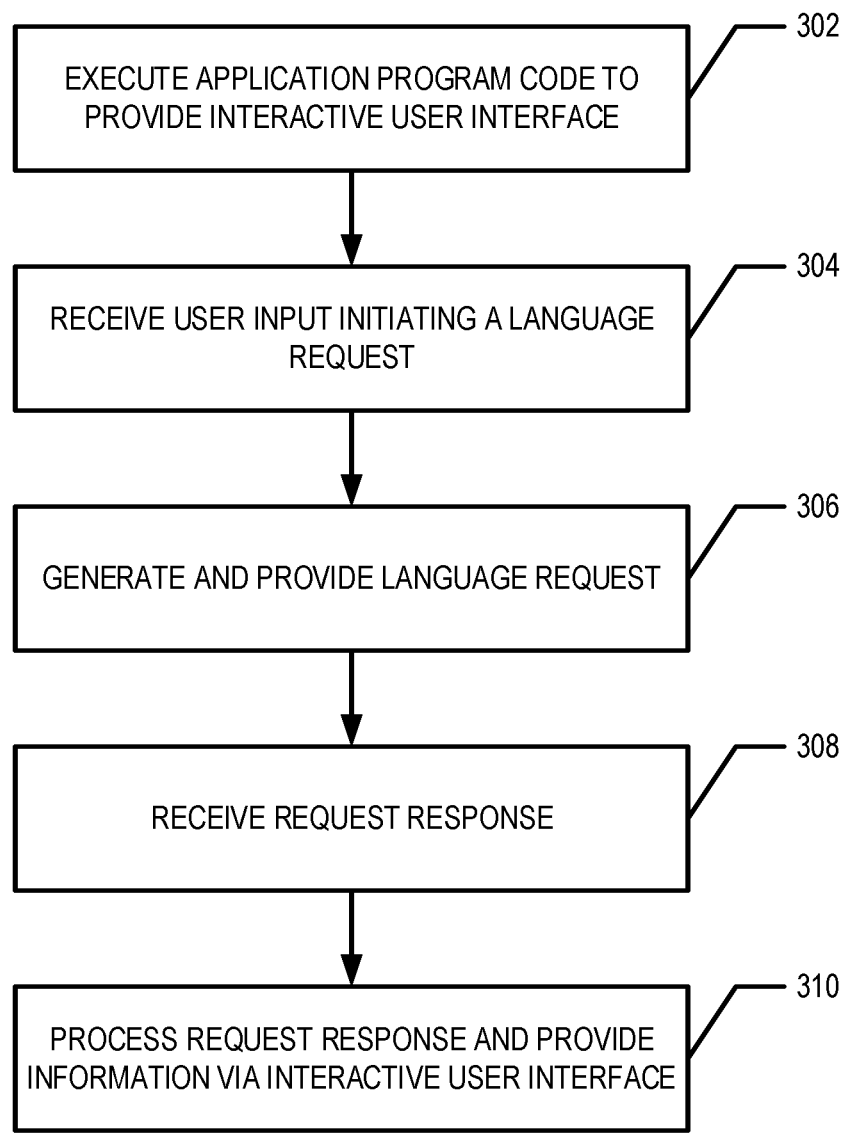

LANGUAGE DENSITY LOCATOR

TECHNOLOGICAL FIELD

An example embodiment relates generally to identifying areas and/or points of interest (POIs) having a particular language density, a language density in a particular density range, and/or a language density that satisfies one or more threshold requirements. An example embodiment relates generally to providing an interactive user interface (IUI) for providing a user with information regarding areas and/or POIs identified as having a particular language density, a language density in a particular density range, and/or a language density that satisfies one or more threshold requirements.

BACKGROUND

In various scenarios, it may be desired to identify points of interest (POIs), such as a restaurant, night club, and/or the like, in a particular geographic region that is associated with a particular culture (e.g., where a particular language is commonly spoken by customers). For example, a user may wish to identify the Japanese restaurant in a geographic region that serves the most authentic Japanese food. In another example, a user may wish to find a night club where other people having a similar cultural background to the user tend to frequent.

BRIEF SUMMARY OF SOME EXAMPLE EMBODIMENTS

Various embodiments provide methods, systems, apparatuses, and computer program products for identifying areas or points of interest (POIs) having a high density, a density within a particular range, or a density that satisfies one or more threshold requirements of individuals who are able to communicate via a particular language. In various embodiments, a language may be associated with an individual and/or an individual's user apparatus based on a language setting on the user apparatus (e.g., a language setting for the operating system of the user apparatus), a language setting on one or more applications operating and/or stored at least in part on the user apparatus, and/or based on a user profile corresponding to the individual and associated with the user apparatus (e.g., the user profile comprises an apparatus identifier that identifies the user apparatus). In various embodiments, areas or POIs having a high density, a density within a particular range, or a density that satisfies one or more threshold requirements of individuals who are associated with a particular language may be identified. For example, the location of a plurality of user apparatuses may be determined and, based on the language(s) associated with each of the plurality of user apparatuses, areas or POIs having a high density, a density within a particular range, or a density that satisfies one or more threshold requirements of individuals (and/or corresponding user apparatuses) may be identified.

Various embodiments of the present invention provide methods, apparatuses, systems, and computer program products for providing an IUI for providing a user with information/data regarding areas and/or POIs determined to have a high density, a density within a particular range, or a density that satisfies one or more threshold requirements of individuals and/or user apparatuses associated with a particular language (referred to as density areas and/or POIs). For example, the IUI may provide a map display and/or a list presentation identifying one or more density areas and/or POIs. In some embodiments, the IUI may provide information/data regarding one or more density areas and/or POIs associated with various languages. For example, density areas and/or POIs associated with a first language may be provided as well as density areas and/or POIs associated with a second language. In an example embodiment, the IUI may provide an option of initiating communication with one or more individuals and/or user apparatuses associated with a particular language.

Various embodiments of the present invention provide technical solutions to technical problems regarding identifying areas and/or POIs having a high density, a density within a particular range, or a density that satisfies one or more threshold requirements of individuals and/or user apparatuses associated with a particular language. For example, each user apparatus may comprise a location sensor (e.g., a global navigation system sensor (GNSS) and/or the like). The location of each of a plurality of user apparatuses may be polled to identify the location of each user apparatus. For example, the location sensor of a first user apparatus may determine the location of the first apparatus and provide the location of the first apparatus in response to a poll request. A network apparatus may then determine areas and/or POIs having a density of individuals and/or user apparatuses associated with a particular language based on user apparatus locations received in response to the polling. Additionally, the requesting user apparatus may provide an IUI configured for providing the user with information/data regarding density areas and/or POIs. In an example embodiment, the IUI may be configured to initiate communication with an individual (via the requesting user apparatus and the user apparatus corresponding to the individual) without providing the contact information (e.g., user name, telephone number, and/or the like) to the user of the requesting user apparatus. The individual is identified as someone who is able to communicate via a particular language (or a first language and a second language). The individual is located within a particular geographic region, as determined by a poll result provided by the user apparatus corresponding to the individual.

In an example embodiment, a language request provided by a requesting user apparatus is received. A poll request is generated and provided to a plurality of responding user apparatuses. Poll responses are received from at least a portion of the plurality of responding user apparatuses. Each poll response indicates a current location of the corresponding responding user apparatus. Each user apparatus of the at least a portion of the plurality of user apparatuses is associated with a language. Based on the poll responses, one or more density areas or points of interest (POIs) are identified. Each density area and/or POI has a density of poll responses that (a) indicate a current location that corresponds to the area and/or POI and (b) are associated with a particular language. A request response comprises information identifying at least one density area and/or POI of the one or more density areas and/or POIs. The request response is provided such that the requesting user apparatus receives the request response. The requesting user apparatus is configured to, responsive to receiving the request response, provide information regarding the at least one density area and/or POI via an interactive user interface.

In accordance with an aspect of the present invention, a method for identifying and providing information/data regarding density areas and/or POIs associated with a particular language and/or various languages is provided. In an example embodiment, the method comprises receiving a language request provided by a requesting user apparatus and generating a poll request and providing the poll request to a plurality of responding user apparatuses. The method further comprises receiving poll responses from at least a portion of the plurality of responding user apparatuses. Each poll response indicates a current location of the corresponding responding user apparatus. Each responding user apparatus of the at least a portion of the plurality of responding user apparatuses is associated with a language. The method further comprises, based on the poll responses, identifying one or more density areas or points of interest (POIs). Each density area and/or POI has a density of poll responses that (a) indicate a current location that corresponds to the area and/or POI and (b) is associated with a particular language. The method further comprises generating a request response comprising information (a) identifying at least one density area and/or POI of the one or more density areas and/or POIs and (b) identifying the particular language corresponding to the at least one density area and/or POI. The method further comprises providing the request response such that the requesting user apparatus receives the request response. The requesting user apparatus is configured to, responsive to receiving the request response, provide information regarding the at least one density area and/or POI via an interactive user interface.

In an example embodiment, the language associated with a responding user apparatus is determined based on at least one of (a) a language setting of the responding user apparatus, (b) a language setting of an application on the responding user apparatus or (c) a profile corresponding to the responding user apparatus. In an example embodiment, the method further comprises filtering the poll responses to remove poll responses from responding user apparatuses that have been located within a threshold distance of the current location of the responding user apparatus for longer than a threshold amount of time. In an example embodiment, the method further comprises accessing historical density area and/or POI data, wherein the one or more density areas and/or POIs are identified based at least in part on the historical density area and/or POI data. In an example embodiment, the language request indicates a geographic region and the at least one density area and/or POI is located within the geographic region. In an example embodiment, an area or POI is identified as a density area and/or POI associated with a first language when a ratio of (a) a number of poll responses indicating a current location corresponding to the area or POI and provided by responding user apparatuses associated with the first language to (b) (i) a number of poll responses indicating a current location corresponding to the area or POI or (ii) a number of poll responses indicating a current location corresponding to the area or POI and associated with a second language satisfies a threshold requirement. In an example embodiment, the threshold requirement is either (a) predetermined or (b) determined based on the poll responses. In an example embodiment, the interactive user interface is configured to allow a first user operating the requesting user apparatus to cause initiation of an anonymous communication with a first individual via a first responding user apparatus of the plurality of user apparatuses based on a language associated with the first responding user apparatus. In an example embodiment, the interactive user interface provides a list or a map indicating at the least one density area and/or POI. In an example embodiment, the list or map indicates the particular language corresponding to the at least one density area and/or POI. In an example embodiment, the poll request is generated either (a) responsive to receiving the language request or (b) on a periodic basis. In an example embodiment, the language request is provide by the requesting user apparatus in response to user interaction with the interactive user interface provided via a user interface of the requesting user apparatus. In an example embodiment, each responding user apparatus comprises a location sensor and the current location of the responding user apparatus is determined by the location sensor. In an example embodiment, a route is determined from an origin to the at least one density area and/or POI. In an example embodiment, the origin is a location of the requesting user apparatus as determined by a location sensor of the requesting user apparatus.

According to another aspect of the present invention, an apparatus is provided. In an example embodiment, the apparatus comprises at least one processor, at least one non-transitory memory storing computer program code, and at least one communications interface configured to communicate via at least one network. The computer program code is configured to, when executed by the at least one processor, cause the apparatus to at least receive a language request provided by a requesting user apparatus; and generate a poll request and provide the poll request to a plurality of responding user apparatuses. The computer program code is further configured to, when executed by the at least one processor, cause the apparatus to at least receive poll responses from at least a portion of the plurality of responding user apparatuses. Each poll response indicates a current location of the corresponding responding user apparatus. Each responding user apparatus of the at least a portion of the plurality of responding user apparatuses is associated with a language. The computer program code is further configured to, when executed by the at least one processor, cause the apparatus to at least, based on the poll responses, identify one or more density areas or points of interest (POIs). Each density area and/or POI has a density of poll responses that (a) indicate a current location that corresponds to the area and/or POI and (b) is associated with a particular language. The computer program code is further configured to, when executed by the at least one processor, cause the apparatus to at least generate a request response comprising information identifying at least one density area and/or POI of the one or more density areas and/or POIs. The computer program code is further configured to, when executed by the at least one processor, cause the apparatus to at least provide the request response such that the requesting user apparatus receives the request response. The requesting user apparatus is configured to, responsive to receiving the request response, provide information regarding the at least one density area and/or POI via an interactive user interface.

In an example embodiment, the language associated with a responding user apparatus is determined based on at least one of (a) a language setting of the responding user apparatus, (b) a language setting of an application on the responding user apparatus or (c) a profile corresponding to the responding user apparatus. In an example embodiment, the computer program code is further configured to, when executed by the at least one processor, cause the apparatus to at least filter the poll responses to remove poll responses from responding user apparatuses that have been located within a threshold distance of the current location of the responding user apparatus for longer than a threshold amount of time. In an example embodiment, the computer program code is further configured to, when executed by the at least one processor, cause the apparatus to at least access historical density area and/or POI data, wherein the one or more density areas and/or POIs are identified based at least in part on the historical density area and/or POI data. In an example embodiment, the language request indicates a geographic region and the at least one density area and/or POI is located within the geographic region. In an example embodiment, an area or POI is identified as a density area and/or POI associated with a first language when a ratio of (a) a number of poll responses indicating a current location corresponding to the area or POI and provided by responding user apparatuses associated with the first language to (b) (i) a number of poll responses indicating a current location corresponding to the area or POI or (ii) a number of poll responses indicating a current location corresponding to the area or POI and associated with a second language satisfies a threshold requirement. In an example embodiment, the threshold requirement is either (a) predetermined or (b) determined based on the poll responses. In an example embodiment, the interactive user interface is configured to allow a first user operating the requesting user apparatus to cause initiation of an anonymous communication with a first individual via a first responding user apparatus of the plurality of user apparatuses based on a language associated with the first responding user apparatus. In an example embodiment, the interactive user interface provides a list or a map indicating at the least one density area and/or POI. In an example embodiment, the list or map indicates the particular language corresponding to the at least one density area and/or POI. In an example embodiment, the poll request is generated either (a) responsive to receiving the language request or (b) on a periodic basis. In an example embodiment, the language request is provide by the requesting user apparatus in response to user interaction with the interactive user interface provided via a user interface of the requesting user apparatus. In an example embodiment, each responding user apparatus comprises a location sensor and the current location of the responding user apparatus is determined by the location sensor. In an example embodiment, a route is determined from an origin to the at least one density area and/or POI. In an example embodiment, the origin is a location of the requesting user apparatus as determined by a location sensor of the requesting user apparatus.

In accordance with still another aspect of the present invention, a computer program product is provided. The computer program product comprises at least one non-transitory computer-readable storage medium having computer-executable program code instructions stored therein. The computer-executable program code instructions comprise program code instructions configured to, when executed by a processor of an apparatus, cause the apparatus to at least receive a language request provided by a requesting user apparatus; and generate a poll request and provide the poll request to a plurality of responding user apparatuses. The computer-executable program code instructions further comprise program code instructions configured to, when executed by the processor of an apparatus, cause the apparatus to at least receive poll responses from at least a portion of the plurality of responding user apparatuses. Each poll response indicates a current location of the corresponding responding user apparatus. Each responding user apparatus of the at least a portion of the plurality of responding user apparatuses is associated with a language. The computer-executable program code instructions further comprise program code instructions configured to, when executed by the processor of an apparatus, cause the apparatus to at least, based on the poll responses, identify one or more density areas or points of interest (POIs). Each density area and/or POI has a density of poll responses that (a) indicate a current location that corresponds to the area and/or POI and (b) is associated with a particular language. The computer-executable program code instructions further comprise program code instructions configured to, when executed by the processor of an apparatus, cause the apparatus to at least generate a request response comprising information identifying at least one density area and/or POI of the one or more density areas and/or POIs. The computer-executable program code instructions further comprise program code instructions configured to, when executed by the processor of an apparatus, cause the apparatus to at least provide the request response such that the requesting user apparatus receives the request response. The requesting user apparatus is configured to, responsive to receiving the request response, provide information regarding the at least one density area and/or POI via an interactive user interface.

In an example embodiment, the language associated with a responding user apparatus is determined based on at least one of (a) a language setting of the responding user apparatus, (b) a language setting of an application on the responding user apparatus or (c) a profile corresponding to the responding user apparatus. In an example embodiment, the computer-executable program code instructions further comprise program code instructions configured to, when executed by the processor of an apparatus, cause the apparatus to at least filter the poll responses to remove poll responses from responding user apparatuses that have been located within a threshold distance of the current location of the responding user apparatus for longer than a threshold amount of time. In an example embodiment, the computer-executable program code instructions further comprise program code instructions configured to, when executed by the processor of an apparatus, cause the apparatus to at least access historical density area and/or POI data, wherein the one or more density areas and/or POIs are identified based at least in part on the historical density area and/or POI data. In an example embodiment, the language request indicates a geographic region and the at least one density area and/or POI is located within the geographic region. In an example embodiment, an area or POI is identified as a density area and/or POI associated with a first language when a ratio of (a) a number of poll responses indicating a current location corresponding to the area or POI and provided by responding user apparatuses associated with the first language to (b) (i) a number of poll responses indicating a current location corresponding to the area or POI or (ii) a number of poll responses indicating a current location corresponding to the area or POI and associated with a second language satisfies a threshold requirement. In an example embodiment, the threshold requirement is either (a) predetermined or (b) determined based on the poll responses. In an example embodiment, the interactive user interface is configured to allow a first user operating the requesting user apparatus to cause initiation of an anonymous communication with a first individual via a first responding user apparatus of the plurality of user apparatuses based on a language associated with the first responding user apparatus. In an example embodiment, the interactive user interface provides a list or a map indicating at the least one density area and/or POI. In an example embodiment, the list or map indicates the particular language corresponding to the at least one density area and/or POI. In an example embodiment, the poll request is generated either (a) responsive to receiving the language request or (b) on a periodic basis. In an example embodiment, the language request is provide by the requesting user apparatus in response to user interaction with the interactive user interface provided via a user interface of the requesting user apparatus. In an example embodiment, each responding user apparatus comprises a location sensor and the current location of the responding user apparatus is determined by the location sensor. In an example embodiment, a route is determined from an origin to the at least one density area and/or POI. In an example embodiment, the origin is a location of the requesting user apparatus as determined by a location sensor of the requesting user apparatus.

In still another aspect of the present invention, an apparatus is provided. In an example embodiment, the apparatus comprises means for receiving a language request provided by a requesting user apparatus. The apparatus comprises means for generating a poll request and providing the poll request to a plurality of responding user apparatuses. The apparatus comprises means for receiving poll responses from at least a portion of the plurality of responding user apparatuses. Each poll response indicates a current location of the corresponding responding user apparatus. Each responding user apparatus of the at least a portion of the plurality of responding user apparatuses is associated with a language. The apparatus comprises means for, based on the poll responses, identifying one or more density areas or points of interest (POIs). Each density area and/or POI has a density of poll responses that (a) indicate a current location that corresponds to the area and/or POI and (b) is associated with a particular language that is within a particular range, satisfies on or more threshold requirements, and/or the like. The apparatus comprises means for generating a request response comprising information identifying at least one density area and/or POI of the one or more density areas and/or POIs. The apparatus comprises means for providing the request response such that the requesting user apparatus receives the request response. The requesting user apparatus is configured to, responsive to receiving the request response, provide information regarding the at least one density area and/or POI via an interactive user interface.

In an example embodiment, an IUI is provided via a user interface of a user apparatus. User input is received via the IUI initiating a language request. The language request is generated and provided by the user apparatus such that a network apparatus receives the language request. A request response generated by the network apparatus is received. The network apparatus generates the request response based on polling of a plurality of user apparatuses. The request response comprises information identifying at least one density area and/or POI. Responsive to receiving the request response, information regarding the density area and/or POI is provided via the IUI.

In accordance with an aspect of the present invention, a method for providing information regarding a density area and/or POI is provided. In an example embodiment, the method comprises providing an IUI via a user interface of a user apparatus. The method further comprises receiving user input via the IUI initiating a language request. The method further comprises generating and providing the language request by the user apparatus such that a network apparatus receives the language request. The method further comprises receiving a request response generated by the network apparatus. The network apparatus generates the request response based on polling of a plurality of user apparatuses. The request response comprises information identifying at least one density area and/or POI. The method further comprises, responsive to receiving the request response, providing information regarding the density area and/or POI via the IUI.

In an example embodiment, the at least one density area and/or POI is identified based at least in part on the historical density area and/or POI data. In an example embodiment, the language request indicates a geographic region and the at least one density area and/or POI is located within the geographic region. In an example embodiment, an area or POI is identified as a density area or POI associated with a first language when a ratio of (a) a number of poll responses received by the network apparatus that were provided by at least a portion of the plurality of user apparatuses indicating a current location corresponding to the area or POI and provided by user apparatuses associated with the first language to (b) (i) a number of poll responses indicating a current location corresponding to the area or POI or (ii) a number of poll responses received by the network apparatus that were provided by at least a portion of the plurality of user apparatuses indicating a current location corresponding to the area or POI and associated with a second language satisfies a threshold requirement. In an example embodiment, the threshold requirement is either (a) predetermined or (b) determined based on the poll responses. In an example embodiment, the IUI provides a list or a map indicating at the least one density area and/or POI. In an example embodiment, the list or map indicates the particular language corresponding to the at least one density area and/or POI. In an example embodiment, the network apparatus polls the plurality of user apparatuses either (a) responsive to receiving the language request or (b) on a periodic basis.

According to yet another aspect of the present invention, an apparatus is provided. In an example embodiment, the apparatus comprises at least one processor, at least one non-transitory memory storing computer program code, at least one communications interface configured to communicate via at least one network, and a user interface. The computer program code configured to, when executed by the at least one processor, cause the apparatus to at least provide an IUI via the user interface; receive user input via the IUI initiating a language request; generate and provide the language request such that a network apparatus receives the language request; receive a request response generated by the network apparatus based on a polling of a plurality of user apparatuses, the request response comprising information identifying at least one density area and/or POI; and responsive to receiving the request response, provide, via the IUI, information regarding the density area and/or POI.

In an example embodiment, the at least one density area and/or POI is identified based at least in part on the historical density area and/or POI data. In an example embodiment, the language request indicates a geographic region and the at least one density area and/or POI is located within the geographic region. In an example embodiment, an area or POI is identified as a density area or POI associated with a first language when a ratio of (a) a number of poll responses received by the network apparatus that were provided by at least a portion of the plurality of user apparatuses indicating a current location corresponding to the area or POI and provided by user apparatuses associated with the first language to (b) (i) a number of poll responses indicating a current location corresponding to the area or POI or (ii) a number of poll responses received by the network apparatus that were provided by at least a portion of the plurality of user apparatuses indicating a current location corresponding to the area or POI and associated with a second language satisfies a threshold requirement. In an example embodiment, the threshold requirement is either (a) predetermined or (b) determined based on the poll responses. In an example embodiment, the IUI provides a list or a map indicating at the least one density area and/or POI. In an example embodiment, the list or map indicates the particular language corresponding to the at least one density area and/or POI. In an example embodiment, the network apparatus polls the plurality of user apparatuses either (a) responsive to receiving the language request or (b) on a periodic basis.

In accordance with still another aspect of the present invention, a computer program product is provided. The computer program product comprises at least one non-transitory computer-readable storage medium having computer-executable program code instructions stored therein. The computer-executable program code instructions comprise program code instructions configured to, when executed by a processor of an apparatus, cause the apparatus to at least provide an IUI via the user interface; receive user input via the IUI initiating a language request; generate and provide the language request such that a network apparatus receives the language request; receive a request response generated by the network apparatus based on a polling of a plurality of user apparatuses, the request response comprising information identifying at least one density area and/or POI; and responsive to receiving the request response, provide, via the IUI, information regarding the density area and/or POI.

In an example embodiment, the at least one density area and/or POI is identified based at least in part on the historical density area and/or POI data. In an example embodiment, the language request indicates a geographic region and the at least one density area and/or POI is located within the geographic region. In an example embodiment, an area or POI is identified as a density area or POI associated with a first language when a ratio of (a) a number of poll responses received by the network apparatus that were provided by at least a portion of the plurality of user apparatuses indicating a current location corresponding to the area or POI and provided by user apparatuses associated with the first language to (b) (i) a number of poll responses indicating a current location corresponding to the area or POI or (ii) a number of poll responses received by the network apparatus that were provided by at least a portion of the plurality of user apparatuses indicating a current location corresponding to the area or POI and associated with a second language satisfies a threshold requirement. In an example embodiment, the threshold requirement is either (a) predetermined or (b) determined based on the poll responses. In an example embodiment, the IUI provides a list or a map indicating at the least one density area and/or POI. In an example embodiment, the list or map indicates the particular language corresponding to the at least one density area and/or POI. In an example embodiment, the network apparatus polls the plurality of user apparatuses either (a) responsive to receiving the language request or (b) on a periodic basis.

In still another aspect of the present invention, an apparatus is provided. In an example embodiment, the apparatus comprises means for providing an IUI via a user interface of the apparatus. The apparatus comprises means for receiving user input via the IUI initiating a language request. The apparatus comprises means for generating and providing the language request by the apparatus such that a network apparatus receives the language request. The method further comprises receiving a request response generated by the network apparatus. The network apparatus generates the request response based on polling of a plurality of user apparatuses. The request response comprises information identifying at least one density area and/or POI. The apparatus comprises means for, responsive to receiving the request response, providing information regarding the density area and/or POI via the IUI.

BRIEF DESCRIPTION OF THE DRAWINGS

Figure 1:
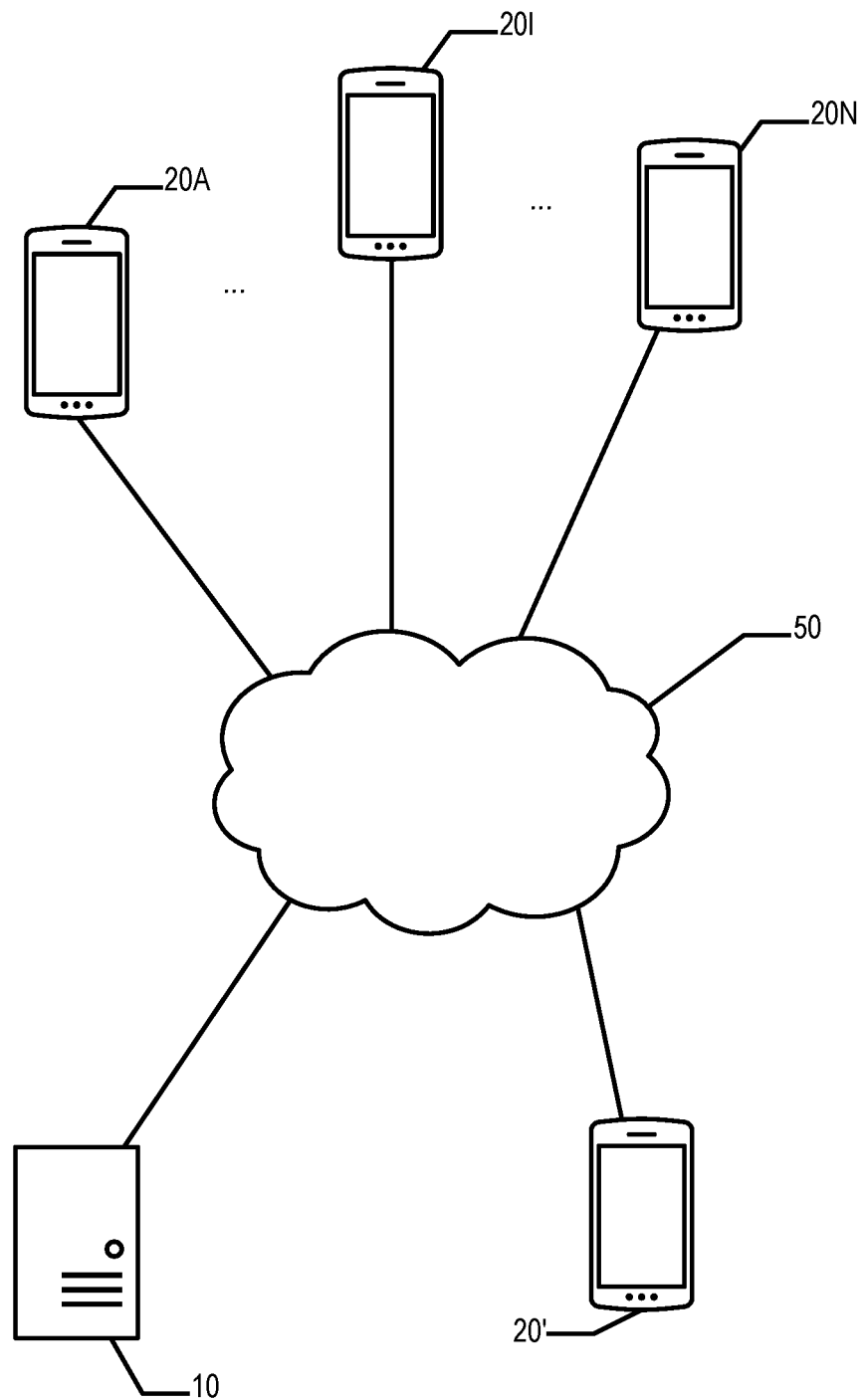
Figure 2A:
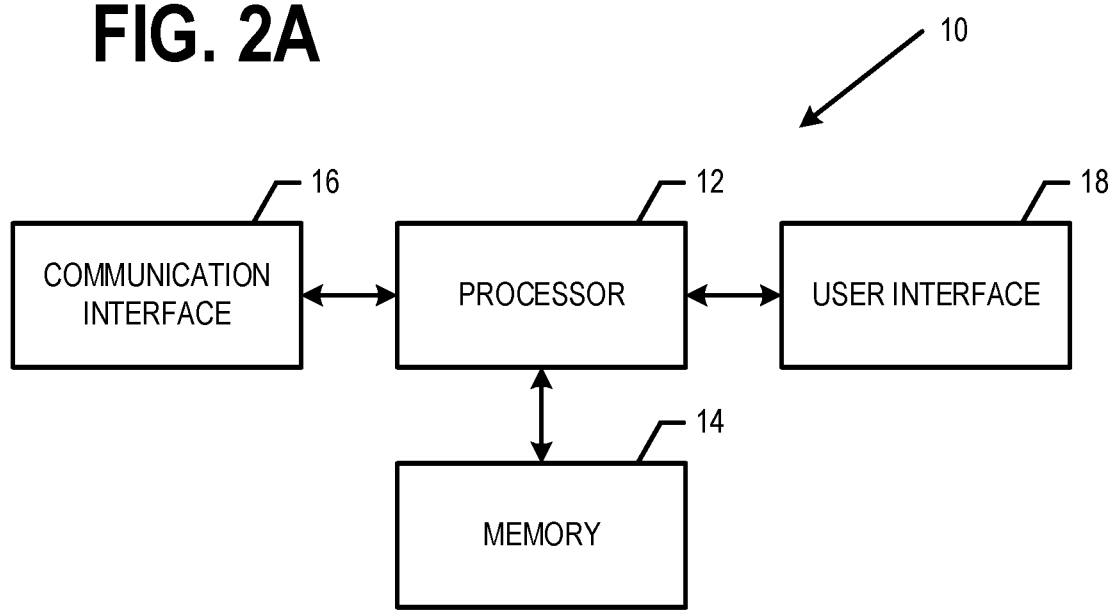
Figure 2B:
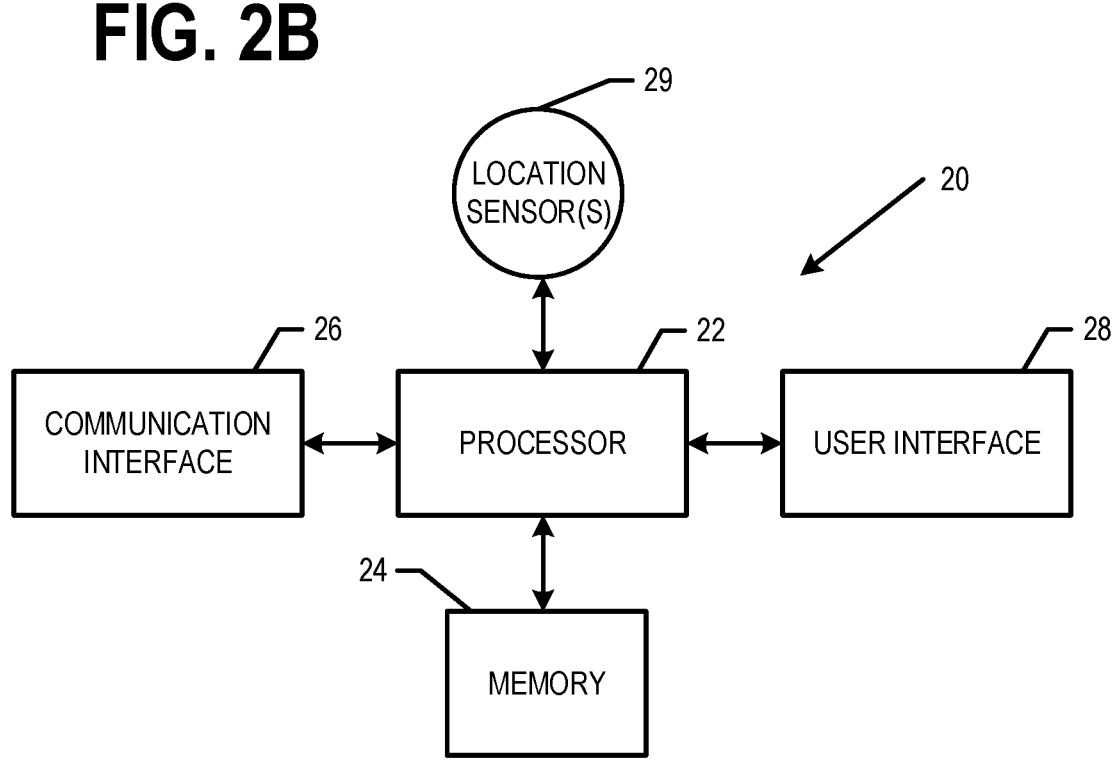
Figure 4:
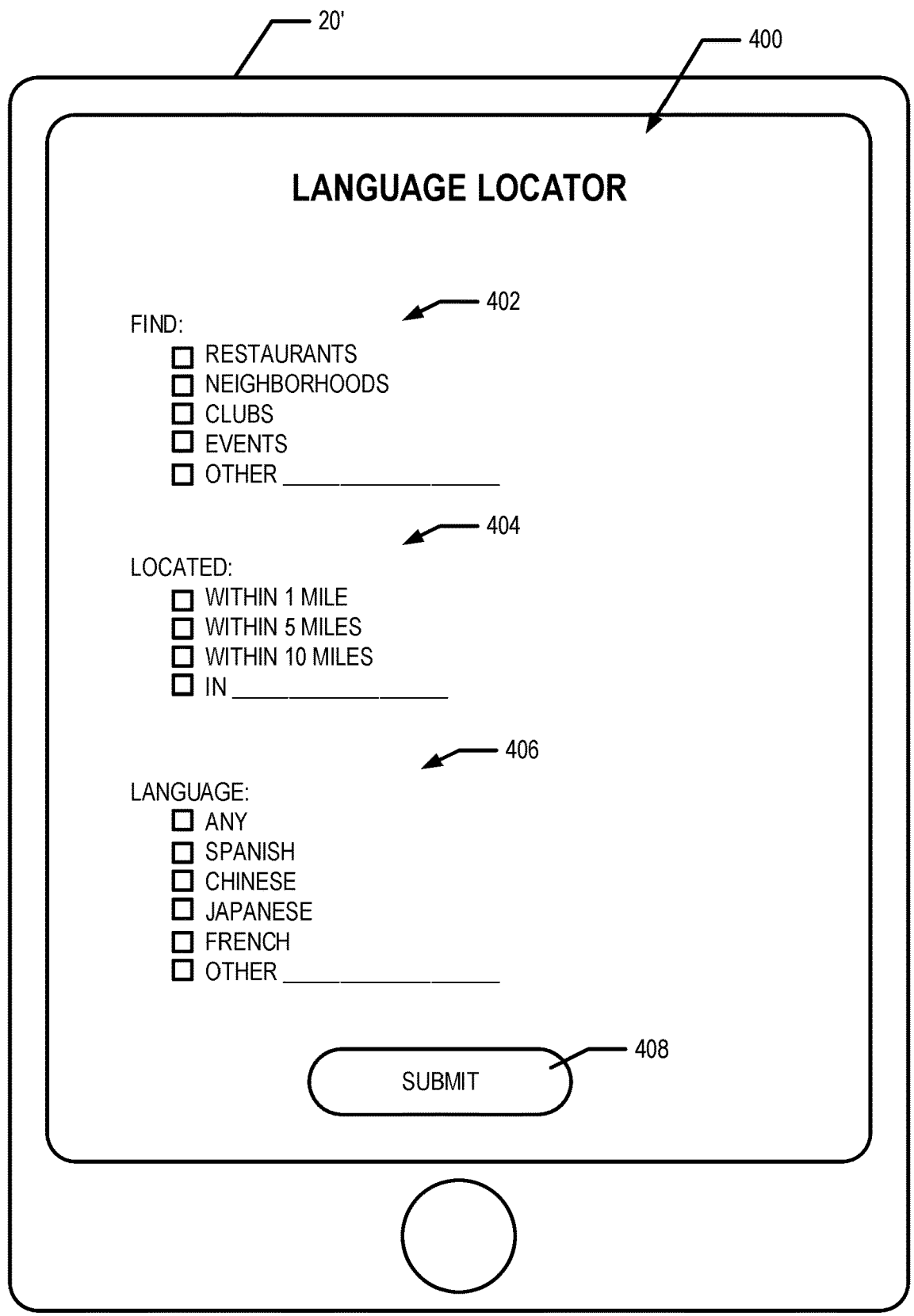
Figure 5:
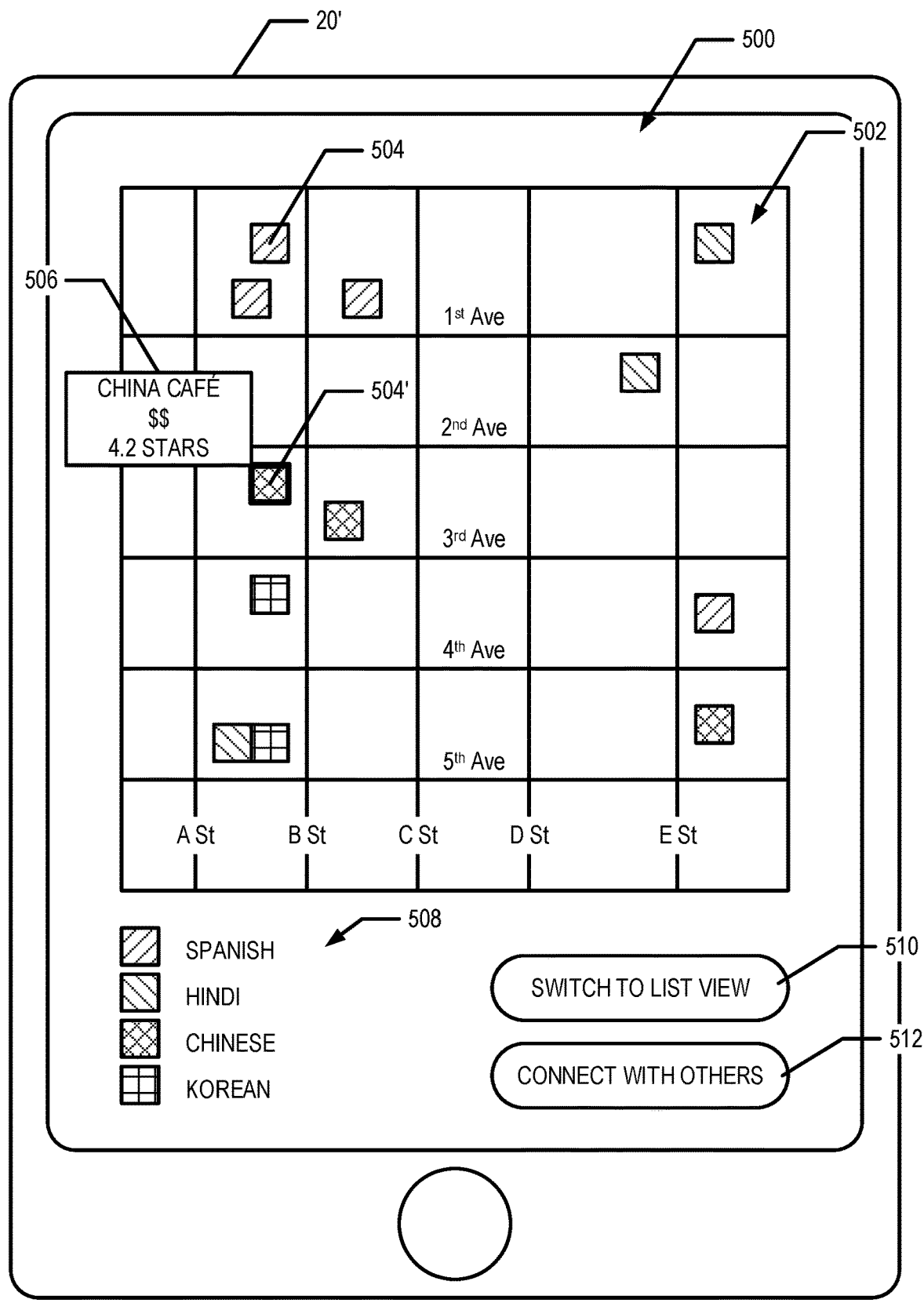
Figure 6:
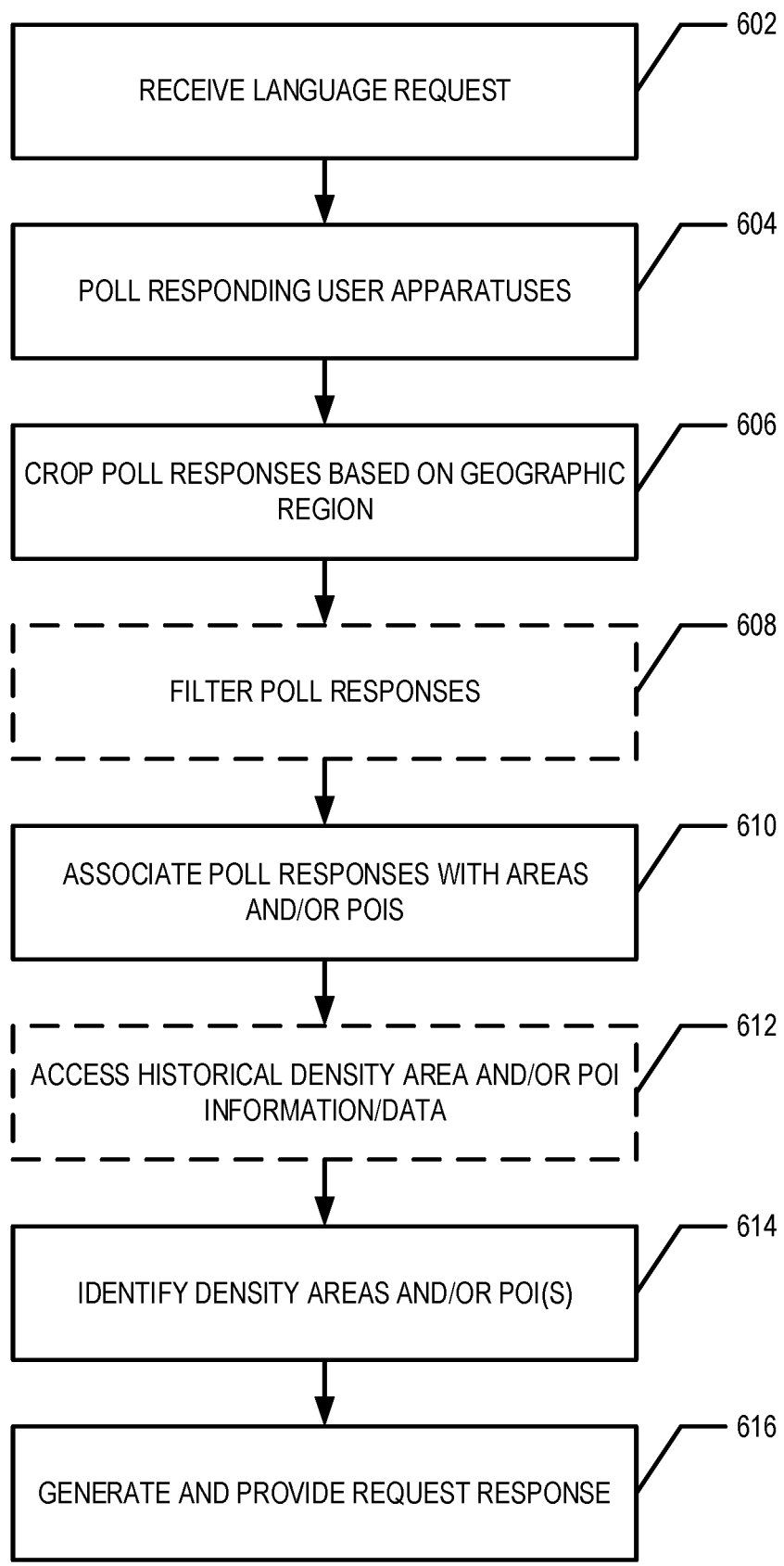
Figure 7:
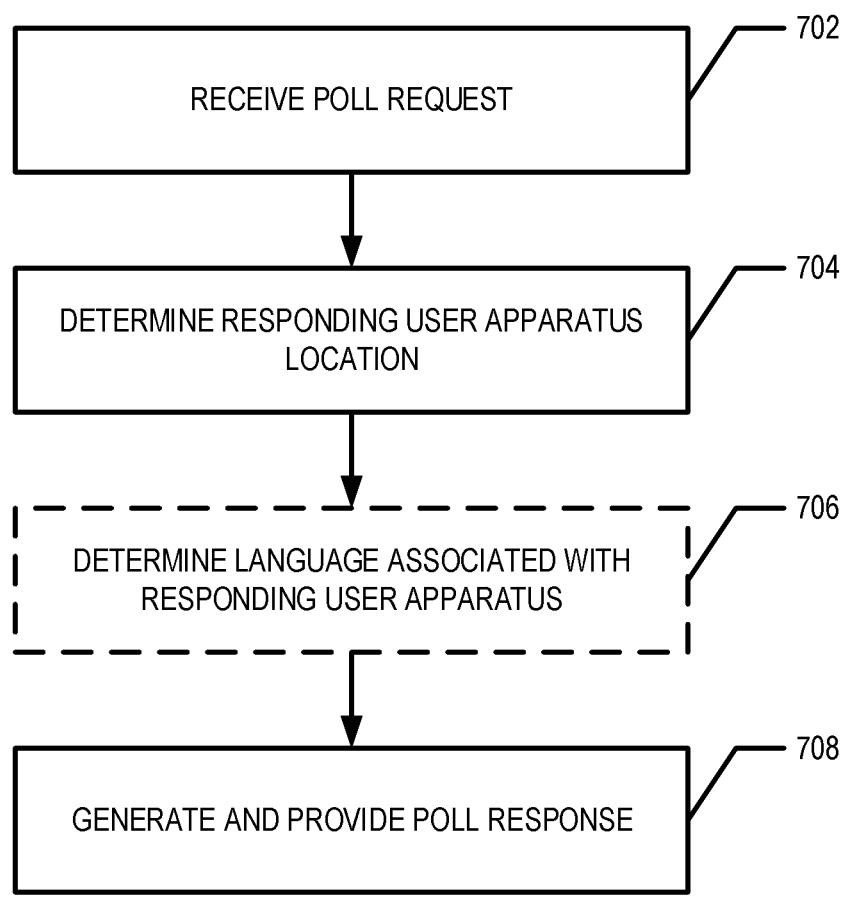

Having thus described certain example embodiments in general terms, reference will hereinafter be made to the accompanying drawings, which are not necessarily drawn to scale, and wherein:

FIG. 1 is a block diagram showing an example architecture of one embodiment;

FIG. 2A is a block diagram of a network apparatus that may be specifically configured in accordance with an example embodiment;

FIG. 2B is a block diagram of a user apparatus that may be specifically configured in accordance with an example embodiment;

FIG. 3 is a flowchart illustrating operations performed, such as by a requesting user apparatus of FIG. 2B, to generate and provide information/data regarding one or more density areas and/or POIs, according to an example embodiment;

FIG. 4 provides an example view of a requesting IUI provided via a user interface of a requesting user apparatus of FIG. 2B, according to an example embodiment;

FIG. 5 provides an example view of a results IUI provided via user interface of a requesting user apparatus of FIG. 2B, according to an example embodiment;

FIG. 6 is a flowchart illustrating operations performed, such as a network apparatus of FIG. 2A, to identify density areas and/or POIs and provide information/data regarding density areas and/or POIs, according to an example embodiment; and FIG. 7 is a flowchart illustrating operations performed, such as by a responding user apparatus of FIG. 2B, to provide a poll response, according to an example embodiment.

DETAILED DESCRIPTION OF SOME EXAMPLE EMBODIMENTS

Some embodiments will now be described more fully hereinafter with reference to the accompanying drawings, in which some, but not all, embodiments of the invention are shown. Indeed, various embodiments of the invention may be embodied in many different forms and should not be construed as limited to the embodiments set forth herein; rather, these embodiments are provided so that this disclosure will satisfy applicable legal requirements. The term "or" (also denoted "/") is used herein in both the alternative and conjunctive sense, unless otherwise indicated. The terms "illustrative" and "exemplary" are used to be examples with no indication of quality level. Like reference numerals refer to like elements throughout. As used herein, the terms "data," "content," "information," and similar terms may be used interchangeably to refer to data capable of being transmitted, received and/or stored in accordance with embodiments of the present invention. As used herein, the terms "substantially" and "approximately" refer to values that are within manufacturing and/or engineering guidelines, allowances, and/or limits. Thus, use of any such terms should not be taken to limit the spirit and scope of embodiments of the present invention.

Additionally, as used herein, the term 'circuitry' refers to (a) hardware-only circuit implementations (e.g., implementations in analog circuitry and/or digital circuitry); (b) combinations of circuits and computer program product(s) comprising software and/or firmware instructions stored on one or more computer readable memories that work together to cause an apparatus to perform one or more functions described herein; and (c) circuits, such as, for example, a microprocessor(s) or a portion of a microprocessor(s), that require software or firmware for operation even if the software or firmware is not physically present. This definition of 'circuitry' applies to all uses of this term herein, including in any claims. As a further example, as used herein, the term 'circuitry' also includes an implementation comprising one or more processors and/or portion(s) thereof and accompanying software and/or firmware.

I. General Overview

Methods, apparatus, systems, and computer program products are provided for identifying density areas and/or POIs. Each density area or POI has been determined to have a high density, a density within a particular range, a density that satisfies one or more threshold requirements, and/or the like of individuals and/or corresponding user apparatuses that are associated with a particular language. The particular language corresponding to a user apparatus may be determined based on a language setting on the user apparatus (e.g., a language setting for the operating system of the user apparatus), a language setting on one or more applications operating and/or stored at least in part on the user apparatus, and/or based on a user profile corresponding to the individual and associated with the user apparatus (e.g., the user profile comprises an apparatus identifier that identifies the user apparatus). For example, plurality of user apparatuses may be polled periodically and/or in response to receiving a language request to determine the location of each of the plurality of user apparatuses. A language associated with each user apparatus of the plurality of user apparatuses may be determined such that density areas and/or POIs may be identified. Methods, apparatus, systems, and computer program products are provided for providing information/data regarding one or more density areas and/or POIs associated with a particular language and/or various languages. For example, a requesting user interface may be configured to provide a results IUI providing information/data regarding one or more density areas and/or POIs. In an example embodiment, the results IUI may allow a user to initiate a communication (via the requesting user apparatus) with a user apparatus and the corresponding individual associated with a particular language.

For example, a user may operate a requesting user apparatus to request information/data regarding density areas and/or POIs associated with a particular language and/or various languages located with a particular geographic region. A network apparatus may receive a language request that was provided by the requesting user apparatus and poll a plurality of user apparatuses to determine the locations of the user apparatuses. Based on the locations of the user apparatuses and the language(s) associated therewith, the network apparatus identifies one or more density areas and/or POIs and may provide a request response comprising information/data corresponding to at least one of the density areas and/or POIs. The requesting user apparatus may receive the request response and provide at least a portion of the information/data corresponding to the at least one of the density areas and/or POIs via an IUI provided by the requesting user apparatus. In various embodiments, a user apparatus may be configured to receive a poll request, determine a location of the user apparatus (e.g., via a location sensor), and provide a poll response comprising location information/data identifying the location of the user apparatus.

FIG. 1 provides an illustration of an example system that can be used in conjunction with various embodiments of the present invention. As shown in FIG. 1, the system may include one or more network apparatuses 10, a plurality of user apparatuses 20, one or more networks 50, and/or the like. For example, the plurality of user apparatuses 20 may comprise a requesting user apparatus 20' and first, . . . , Ith, . . . , Nth responding user apparatuses 20A, . . . , 20I, . . . , 20N.

In various embodiments, a user apparatus 20, may be a mobile computing device (e.g., a cell phone, mobile phone, smart phone, wearable device such as a smart watch or a heads up display, and/or the like). In an example embodiment, the user apparatus 20 may comprise one or more applications that, when executed, cause the user apparatus 20 to act as a navigation system and perform one or more navigation functions. Some non-limiting examples of navigation functions are localization, route determination, lane level route determination, route travel time determination, lane maintenance, route guidance, lane level route guidance, provision of traffic information/data, provision of lane level traffic information/data, and/or the like.

In an example embodiment, the network apparatus 10 may be a server, group of servers, distributed computing system, and/or other computing system. For example, the network apparatus 10 may be in communication with one or more user apparatuses 20 and/or the like via one or more wired and/or wireless networks 50. In an example embodiment, the network apparatus 10 is remotely located with respect to the user apparatus 20.

In an example embodiment, a network apparatus 10 may comprise components similar to those shown in the example network apparatus 10 diagrammed in FIG. 2A. In various embodiments, the network apparatus 10 is configured to receive location requests (e.g., via one or more networks 50); periodically and/or in response to a location request poll a plurality of user apparatuses 20A, . . . , 20N; identify and/or determine density areas and/or POIs based on the poll responses; provide request responses comprising information/data regarding at least one density area and/or POI (e.g., via one or more networks 50); and/or generate, store, and/or access historical density area and/or POI information/data. In an example embodiment, the network apparatus 10 may be configured to identify and/or determine one or more routes from the location of a requesting user apparatus to one of the identified density areas and/or POIs. For example, as shown in FIG. 2A, the network apparatus 10 may comprise a processor 12, memory 14, a user interface 18, a communications interface 16, and/or other components configured to perform various operations, procedures, functions or the like described herein. In at least some example embodiments, the memory 14 is non-transitory.

In various embodiments, a user apparatus 20 is configured to be a requesting user apparatus 20' and/or a responding user apparatus 20A, . . . , 20N. For example, requesting user apparatus 20' may generate and provide a language request based on user input received via a user interface; receive a request response comprising information/data regarding at least one density area and/or POI, and provide at least a portion of the information/data regarding the at least one density area and/or POI via a IUI via the user interface. For example, responding user apparatus 20A, . . . , 20N may receive a poll request, determine a location of the responding user apparatus using one or more location sensors, and provide a poll response comprising location information/data indicating the location of the responding user apparatus. In an example embodiment, as shown in FIG. 2B, the user apparatus 20 may comprise a processor 22, memory 24, a communications interface 26, a user interface 28, and one or more location sensors 29. In an example embodiment, the one or more location sensors 29 may comprise one or more of a GNSS sensor; IMU sensors; radio frequency identification (RFID) receiver or transceiver, and/or the like. In at least some example embodiments, the memory 24 is non-transitory. In various embodiments, the memory 24 may store at least a portion of a geographic database, digital map, and/or the like comprising map information/data.

In an example embodiment, a network apparatus 10 may be in communication with one or more user apparatuses 20 and/or other computing entities via one or more wired and/or wireless networks 50. For example, each of the components of the system may be in electronic communication with, for example, one another over the same or different wireless or wired networks 50 including, for example, a wired or wireless Personal Area Network (PAN), Local Area Network (LAN), Metropolitan Area Network (MAN), Wide Area Network (WAN), cellular network (e.g., 5G, 4G, LTE, 3G, and/or the like), short and/or medium range communications, fiber to wireless, Wi-Fi, radio data system (RDS) messages over the air radio interface, transport protocol experts group (TPEG) service by connected HyperText Transfer Protocol (HTTP) or User Datagram Protocol (UDP), and/or the like and/or combinations thereof. In some embodiments, a network 50 may comprise the automotive cloud, digital transportation infrastructure (DTI), radio data system (RDS)/high definition (HD) radio or other digital radio system, and/or the like. For example, a user apparatus 20 may be in communication with a network apparatus 10 via the network 50. For example, a network apparatus 10 may communicate with a user apparatus 20 via a network, such as the Cloud. For example, the Cloud may be a computer network that provides shared computer processing resources and data to computers and other devices connected thereto. In another example, a user apparatus 20 may be configured to receive communications (e.g., a notification comprising autonomous driving instructions) via a short and/or mid-range communication protocol.

Certain example embodiments of the network apparatus 10 and/or user apparatus 20, are described in more detail below with respect to FIGS. 2A and 2B.

II. Example Operation

Methods, apparatus, systems, and computer program products are provided for identifying and/or determining density areas and/or POIs. For example, a network apparatus 10 may be configured to identify and/or determine density areas and/or POIs. In various embodiments, a density area and/or POI is an area and/or POI that is identified and/or determined to have a high density, a density that is within a particular range, or a density that satisfies one or more threshold requirements of individuals and/or user apparatuses that are associated with a particular language. Each density area and/or POI is associated with a language. In various embodiments, a language is associated with an individual and/or an individual's user apparatus based on a language setting on the user apparatus (e.g., a language setting for the operating system of the user apparatus), a language setting on one or more applications operating and/or stored at least in part on the user apparatus, and/or based on a user profile corresponding to the individual and associated with the user apparatus (e.g., the user profile comprises an apparatus identifier that identifies the user apparatus). In general, if an individual and/or the individual's user apparatus is associated a particular language, it is assumed that the individual is capable of communicating, at least in part, via the particular language and/or that the individual has a cultural history/association and/or cultural interest with a culture corresponding to the particular language. Thus, various embodiments may be used to identify areas or points of interest (e.g., restaurants, clubs, bars, events, concerts, locations within a hospital or stadium, and/or the like) having a particular and/or threshold requirement satisfying density of individuals and/or user apparatuses corresponding to individuals that are capable of communicating, at least in part, via a particular language and/or that have a cultural history/association and/or cultural interest with a culture corresponding to the particular language.

In various embodiments, the density areas and/or POIs are identified in relation to a dominant language of the geographic region. In an example embodiment, the dominant language of the geographic region may be determined based on geopolitical information/data corresponding to the geographic region (e.g., if the geographic region is located within the United States of America, the dominant language may be taken as English). In an example embodiment, the dominant language may the most common language associated with the responding user apparatuses 20A, . . . , 20N located within the geographic region. In various embodiments, the density areas and/or POIs are identified in relation to the total number of responding user apparatuses 20A, . . . , 20N located within the geographic region.

Methods, apparatus, systems, and computer program products are provided for providing an IUI for providing a user with information/data regarding one or more density areas and/or POIs. For example, a user apparatus 20 may be configured to act as a requesting user apparatus 20' and provide the IUI. For example, the IUI may provide the user with options that may be used in requesting information/data regarding one or more density areas and/or POIs. For example, the IUI may provide the user with a map display, list based presentation, and/or the like of one or more density areas and/or POIs associated with a particular language and/or various languages. In an example embodiment, the IUI may provide the user with an option of initiating communication with an individual (e.g., via the user apparatus corresponding to the individual) that is associated with a particular language and located within a particular geographic region.

Various embodiments may provide users with assistance in a variety of scenarios. For example, a user may wish to identify an authentic ethnic restaurant within walking distance of the user's hotel and may use the IUI to identify restaurants (e.g., a type of POI) that have a high density, a density within a particular range, or a density that satisfies one or more threshold requirements of individuals (e.g., customers) and/or corresponding user apparatuses 20 that are associated with a language corresponding to the culture of the food served at the restaurant to identify an authentic ethnic restaurant. In another example, a user may be new to a city and want to find social opportunities with individuals who have a similar cultural history/association as the user and the user may use the IUI to identify clubs, coffee shops, events, parks, and/or the like (areas and/or POIs) that have a high density, a density within a particular range, or a density that satisfies one or more threshold requirements of individuals and/or corresponding user apparatuses 20 that are associated with a language corresponding to the user's cultural history/association. In another example, a user may be at a hospital, airport, and/or the like and may want to find someone who can act as a translator between a first language and a second language. The user may use the IUI to identify an area within the hospital, airport, and/or the like with a high density, a density within a particular range, or a density that satisfies one or more threshold requirements of individuals and/or corresponding user apparatuses 20 that are associated with at least one of the first or second language such that the user may identify an area within the hospital, airport, and/or the like where the user is likely to find an individual who can act as a translator.

Exemplary Operation of a Requesting User Apparatus

FIG. 3 provides a flowchart illustrating operations performed, such as by a requesting user apparatus 20', to generate and provide an IUI for providing a user with information/data regarding one or more density areas and/or POIs corresponding to a particular language and/or various languages. In various embodiments, a requesting user apparatus 20' is a user apparatus 20 that is being operated by a user to provide an IUI providing information/data regarding one or more density areas and/or POIs.

Starting at block 302, a user apparatus 20 may be operated (e.g., via the user interface 28) such that the user apparatus 20 executes application program code (e.g., stored in the memory 24) such that the user apparatus 20 provides a language locator IUI. The execution of the application program code (e.g., by the processor 22) causes the user apparatus 20 to become the requesting user apparatus 20' for a particular scenario. A requesting user apparatus 20' for one scenario may be a responding user apparatus 20A in various scenarios. For example, the user apparatus may comprise means, such as processor 22, memory 24, user interface 28, and/or the like, for executing application program code that causes the user apparatus 20 to provide a language location IUI.

FIG. 4 provides an example request screen 400 of a language locator IUI provided via a user interface 28 of a requesting user apparatus 20'. In an example embodiment, the request screen 400 comprises a plurality of option selectors 402, 404, 406, and a selectable submission element 408. In various embodiments, the option selectors 402, 404, 406 are configured to provide the user with means for defining one or more parameters of a language request used to identify and/or determine one or more density areas and/or POIs and/or to determine which of the identified and/or determined density areas and/or POIs for which corresponding information/data is to be provided. In various embodiments, the plurality of option selectors 402, 404, 406 may comprise an area and/or POI type selector 402, a geographic region selector 404, a language selector 406, and/or the like.

For example, the area and/or POI type selector 402 may be configured to receive user input (e.g., via an input device) indicating one or more types of areas and/or POIs for which a user is interested in finding density areas and/or POIs. For example, the area and/or POI type selector 402 may provide a user with a list of selectable elements corresponding to various types of areas and/or POIs such as parks, restaurants, coffee shops, events, grocery stores, clubs, bars, neighborhoods, and/or the like. In an example embodiment, the area and/or POI type selector 402 may allow a user to provide user input indicating a type of area and/or POI. For example, a user may be able to type a particular type of area and/or POI into a field of the area and/or POI type selector 402.

The geographic region selector 404 may be configured to receive user input (e.g., via an input device) indicating a geographic region within which the user would like to identify density areas and/or POIs. For example, the geographic region selector 404 may provide a user with a list of selectable elements corresponding to various geographic regions such as within walking distance, biking distance, or driving distance of the requesting user apparatus 20', within a half mile, a mile, two miles, five miles, ten miles, fifteen miles, or twenty miles of the requesting user apparatus 20'; within walking distance of a public transportation station; within a particular town, city, zip code, or neighborhood; and/or the like. In an example embodiment, the geographic region selector 404 is configured to receive user input via a map. For example, the user may draw a boundary of the geographic region on a map displayed via the IUI using an input device (e.g., touch screen, mouse, and/or the like). In an example embodiment, the geographic region selector 404 may allow a user to provide user input indicating a geographic region. For example, a user may be able to type a particular geographic region (e.g., a city name, zip code, neighborhood name, and/or the like) into a field of the geographic area selector 404. In various embodiments, the geographic area selector 404 may provide the user with means to indicate that the geographic area within which density areas and/or POIs should be identified is a particular building, POI, and/or the like (e.g., within a stadium, shopping mall, hospital, airport, courthouse campus, conference center, and/or the like).

For example, the language selector 406 may be configured to receive user input (e.g., via an input device) indicating one or more languages for which a user is interested in finding density areas and/or POIs. For example, the language selector 406 may provide a user with a list of selectable elements corresponding to various languages such as Spanish, French, Italian, German, Indian (such as Hindi or Urdu), Russian, Chinese, Korean, Vietnamese, Japanese, English, and/or the like. In an example embodiment, a language of the one or more languages is associated with a particular dialect of the language (e.g., Australian English, Mexican Spanish, and/or the like). In an example embodiment, the language selector 406 may provide the user with a selectable element indicating the user is interested in finding density areas and/or POIs associated with any language. In an example embodiment, the language selector 406 may allow a user to provide user input indicating a language. For example, a user may be able to type a particular language into a field of the language selector 406.

Various other option selectors may be provided in addition to and/or in place of the area and/or POI selector 402, geographic region selector 404, and/or language selector 406 in various embodiments. A user may interact (e.g., via the IUI and/or one or more input devices) with one or more option selectors to provide and/or define one or more parameters of a language request used to identify and/or determine one or more density areas and/or POIs and/or to determine which of the identified and/or determined density areas and/or POIs for which corresponding information/data is to be provided, and then the user may interact with (e.g., select, press, and/or the like) the selectable submission element 408. User interaction (e.g., selection, pressing, and/or the like) of the selectable submission element 408 may initiate the process of identifying and/or providing information/data regarding one or more density areas and/or POIs. For example, user interaction (e.g., selection, pressing, and/or the like) of the selectable submission element 408 may initiate a language request.

Returning to FIG. 3, at block 304, user input initiating a language request is received. For example, the requesting user apparatus 20' may receive user input initiating a language request. For example, the requesting user apparatus 20' may comprise means, such as processor 22, memory 24, user interface 28, and/or the like, for receiving user input initiating a language request. For example, the user input indicating user interaction with one or more option selectors indicating and/or defining one or more parameters of a language request and user interaction with a selectable submission element. The user interaction with the selectable submission element may cause initiation of a language request including the parameters indicated and/or defined via the user interaction with the one or more option selectors.

At block 306, the language request is generated and provided. For example, the requesting user apparatus 20' may generate the language request and provide the language request. For example, the requesting user apparatus 20' may comprise means, such as processor 22, memory 24, communication interface 26, and/or the like, for generating and providing the language request. In various embodiments, the language request is generated in response to receiving the user input initiating the language request. In various embodiments, the language request is generated based on the one or more parameters indicated and/or defined via the user interaction with the one or more option selectors. For example, in various embodiments, the language request may comprise an indication of a particular language and/or various languages for which the user is interested in receiving information/data regarding corresponding density areas and/or POIs, and/or an indication that the user is interested in receiving information/data regarding density areas and/or POIs associated with any language. For example, in various embodiments, the language request may comprise an indication of the geographical region within which density areas and/or POIs are to be identified. For example, in various embodiments, the language request may comprise an indication of one or more types of areas and/or POIs in which the user is interested. In an example embodiment, the language request may comprise a current location of the requesting user apparatus 20' (e.g., as determined by the location sensor 29) such that a geographic region may be determined based on the current location of the requesting user apparatus 20' (e.g., in situations in which the geographic region is defined by a radius about the current location of the requesting user apparatus 20'). In various embodiments, the requesting user apparatus 20' provides (e.g., transmits) the language request such that the network apparatus 10 receives the language request.

At block 308, a request response is received. For example, a network apparatus 10 may provide a request response in response to the language request such that the requesting user apparatus 20' receives the request response. For example, the requesting user apparatus 20' may comprise means, such as processor 22, memory 24, communication interface 26, and/or the like for receiving a request response. In various embodiments, the request response comprises information/data regarding at least one density area and/or POI identified based on the language request. For example, the request response may comprise information/data regarding at least one density area and/or POI (a) of the type of area and/or POI indicated in the language request, (b) located within the geographic region indicated in the language request, (c) associated with at least one language indicated in the language request, and/or the like. In various embodiments, the information/data regarding the at least one density area and/or POI may comprise a POI identifier. In various embodiments, the information/data regarding the at least one density area and/or POI may comprise a location (e.g., geolocation such as latitude and longitude, street address, and/or the like), a name, an area and/or POI type, contact information/data (e.g., a telephone number, email address, social media handle, link to a website, and/or the like), an associated language, one or more ratings (e.g., number of stars out of five, number of dollar signs indicating an expense level, and/or the like), one or more reviews, and/or the like. In various embodiments, the information/data regarding the at least one density area and/or POI may comprise a POI identifier. In an example embodiment where the requesting user apparatus 20' stores at least a portion of a geographic database (e.g., a digital map), the information/data regarding the at least one density area and/or POI may provide information/data (e.g., a POI identifier) required to identify a POI data record within the geographic database. In various embodiments, the information/data regarding the at least one density area and/or POI may comprise a language associated with the at least one density area and/or POI. In various embodiments, the information/data regarding the at least one density area and/or POI may only comprise the corresponding POI identifier and, optionally, an associated language, so as to reduce the bandwidth required to transmit the request response.

At block 310, the request response is processed and at least a portion of the information/data regarding the at least one density area and/or POI is provided via the IUI. For example, the requesting user apparatus 20' may process the request response and provide at least a portion of the information/data regarding the at least one density area and/or POI via the IUI. For example, the requesting user apparatus 20' may comprise means, such as processor 22, memory 24, user interface 28, and/or the like, for processing the request response and providing at least a portion of the information/data regarding the at least one density area and/or POI via the IUI.

FIG. 5 provides an example map view screen 500 of a language locator IUI provided via a user interface 28 of a requesting user apparatus 20'. In various embodiments, the map view screen 500 provides the user with information/data regarding at least one density area and/or POI identified based on the location request. For example, the map view screen 500 comprises a map 502 and a plurality of density area and/or POI markers 504. A density area and/or POI marker 504 indicates the location of the corresponding density area and/or POI on the map 502. A density area and/or POI marker 504 may further indicate a language associated with the corresponding density area and/or POI, as indicated by the language legend 508, for example. In an example embodiment, the density area and/or POI marker 504 may indicate a density level of the language associated with the corresponding density area and/or POI. For example, if a first density area and/or POI has a language density of 80% the corresponding density area and/or POI marker 504 may be darker in color and/or bolder than a density area and/or POI marker 504 corresponding to a second density area and/or POI that has a language density of 50%.

When a density area and/or POI marker 504 is selected, an information box 506 providing information/data regarding the density area and/or POI represented by the selected density area and/or POI marker 504' is displayed. In an example embodiment, a user may interact (e.g., via the IUI and/or an input device) with the information box 506 to access further information/data regarding the corresponding density area and/or POI, contact information and/or a street address for the corresponding density area and/or POI, a route for traveling from the current location of the requesting user apparatus 20' (as determined by the location sensor 29) or another user-specified origin to the corresponding density area and/or POI, and/or the like. In an example embodiment, the map view screen 500 may comprise a selectable switch to list view element 510. User interaction (e.g., selection, pressing, and/or the like) of the selectable switch to list view element 510 may cause the user interface 28 of the requesting user apparatus 20' to provide information/data regarding the at least one density area and/or POI via a list view rather than as a map view. For example, the list view may comprise one or more entries that include the information/data that is provided in the information box 506 of the map view screen 500, and/or the like. Selection of one or the one or more entries may provide the user with access further information/data regarding the corresponding density area and/or POI, contact information and/or a street address for the corresponding density area and/or POI, a route for traveling from the current location of the requesting user apparatus 20' (as determined by the location sensor 29) or another user-specified origin to the corresponding density area and/or POI, and/or the like.

In various embodiments, the map view screen 500 may comprise a selectable connect with others element 512. In an example embodiment, user interaction (e.g., selection, pressing, and/or the like) with the selectable connect with others element 512 may provide the user with the ability to initiate a communication (e.g., phone call, SMS message, MMS message, email, instant message, a message via a language locator and/or navigation application (e.g., an application corresponding to the application program code executed to provide the IUI), and/or the like) via the requesting user apparatus 20' with a first responding user apparatus 20A. For example, a first individual corresponding to the first responding user apparatus 20A may have, when registering an application on the first responding user apparatus 20A, for example, selected an option that would allow a requesting user apparatus 20' to initiate a communication with the first responding user apparatus 20A when the first responding user apparatus 20A is located within the geographic region of a location request and is associated with a language of the location request. In an example embodiment, the communication between the requesting user apparatus 20' and first responding user apparatus 20A does not provide the user or the first individual with contact information/data for the other party of the communication. For example, the initiated communication may be an anonymous communication. In an example embodiment, the first responding user apparatus 20A is located at a density area and/or POI corresponding to the selected density area and/or POI marker 504'. For example, a user may ask the first individual (e.g., via the initiated anonymous communication) questions regarding the density area and/or POI where the first individual is located, if the first individual can/is willing to act as a translator, and/or the like.

Exemplary Operation of a Network Apparatus

In various embodiments, a network apparatus 10 may receive a language request, poll a plurality of responding user apparatuses, identify density areas and/or POIs based on the poll responses, and provide a request response comprising information/data regarding at least one of the density areas and/or POIs. In various embodiments, a network apparatus 10 may facilitate communication (e.g., an anonymous communication) between a requesting user computing entity 20' and a first responding user apparatus 20A.

FIG. 6 provides a flowchart illustrating operations performed, such as by a network apparatus 10, to generate and provide a response to a language request. Starting at block 602, a language request is received. For example, a network apparatus 10 may receive a language request. For example, a network apparatus 10 may comprise means, such as processor 12, memory 14, communication interface 16, and/or the like, for receiving a language request. In various embodiments, a requesting user apparatus 20' generates and provides the language request such that the network apparatus 10 receives the language request. In various embodiments, the language request may comprise an indication of a particular language and/or various languages for which the user is interested in receiving information/data regarding corresponding density areas and/or POIs, and/or an indication that the user is interested in receiving information/data regarding density areas and/or POIs associated with any language. In various embodiments, the language request may comprise an indication of the geographical region within which density areas and/or POIs are to be identified. In an example embodiment, the language request may comprise a current location of the requesting user apparatus 20' (e.g., as determined by the location sensor 29) such that a geographic region may be determined based on the current location of the requesting user apparatus 20' (e.g., in situations in which the geographic region is defined by a radius about the current location of the requesting user apparatus 20'). In various embodiments, the language request may comprise an indication of one or more types of areas and/or POIs in which the user is interested.

At block 604, a plurality of responding user apparatuses 20A, . . . , 20N are polled. For example, the network apparatus 10 may poll a plurality of responding user apparatuses 20A, . . . , 20N. For example, the network apparatus 10 may comprise means, such as processor 12, memory 14, communication interface 16, and/or the like, for polling a plurality of responding user apparatuses 20A, . . . , 20N. In an example embodiment, the plurality of responding user apparatuses 20A, . . . , 20N are polled in response to the receiving of the location request. In an example embodiment, the plurality of responding user apparatuses 20A, . . . , 20N are polled periodically (e.g., every five minutes, every ten minutes, every fifteen minutes, every half an hour, every hour, every two hours, and/or the like). In an example embodiment, polling the plurality of responding user apparatuses 20A, . . . , 20N comprises generating a poll request, providing (e.g., transmitting) the poll request such that each of the plurality of user apparatuses 20A, . . . , 20N receive the poll request, and receiving a plurality of poll responses. For example, the poll request may include a request for a current location of the responding user apparatus 20I, a request for a length of time that the responding user apparatus 20I has been located within a first threshold distance of the current location of the responding user apparatus 20I, a request for one or more languages associated with the responding user apparatus 20I, and/or the like. A poll response provided by an Ith responding user apparatus 20I may comprise a current location of the responding user apparatus 20I, a length of time that the responding user apparatus 20I has been located within the first threshold distance of the current location of the responding user apparatus 20I, one or more languages associated with the responding user apparatus 20I, and/or the like.

In an example embodiment, a user apparatus is associated with a language based on a corresponding user profile. In one such example embodiment, the plurality of responding user apparatuses 20A, . . . , 20N only comprise user apparatuses 20 associated with the particular and/or various languages indicated by the language request. In an example embodiment, the poll request is provided such that only user apparatus 20A, . . . , 20N located within the geographic region and/or close to the geographic region receive the poll request. For example, the poll request may be provided such that the poll request is broadcasted by one or more broadcast stations, antennae, and/or the like having a broadcast area that overlaps at least in part with the geographic region and the poll request is not broadcasted by broadcast stations, antennae, and/or the like having a broadcast areas that do not overlap at least in part with the geographic region.

At block 606, the plurality of poll responses are cropped based on the geographic region indicated by the language request. For example, the network apparatus 10 may crop the poll responses based on the geographic region indicated by the language request. For example, the network apparatus 10 may comprise means, such as processor 12, memory 14, and/or the like, for cropping the poll responses based on the geographic region indicated by the language request. For example, it may be determined if the current location of the responding user apparatus 20I provided in the corresponding poll response is located within the geographic region indicated by the language request. When it is determined that the current location of the responding user apparatus 20I provided in the corresponding poll response is located outside of and/or not within the geographic region indicated by the language request, the poll response is cropped and/or removed from the plurality of poll responses. When it is determined that the current location of the responding user apparatus 20I provided in the corresponding poll response is located within the geographic region indicated by the language request, the poll response remains part of the plurality of poll responses.

At block 608, the plurality of poll responses are filtered, in an example embodiment. For example, the network apparatus 10 may filter the plurality of poll responses. For example, the network apparatus 10 may comprise means, such as processor 12, memory 14, and/or the like for filtering the plurality of poll responses. In various embodiments, a variety of filters may be used to filter the poll responses. In an example embodiment, the plurality of poll responses may be filtered to remove poll responses corresponding to responding user apparatuses 20I that have been located at the same location for longer than a first threshold amount of time. For example, a poll response may include a length of time that the responding user apparatus 20I has been located within a first threshold distance of the current location of the responding user apparatus 20I. If the length of time that the responding user apparatus 20I has been located within the first threshold distance of the current location of the responding user apparatus 20I is longer than the first threshold amount of time, the poll response may be filtered out of the plurality of poll responses. For example, the poll responses may be filtered to remove stay points corresponding to an amount of time that is longer than a threshold amount of time. For example, the poll responses may be filtered to remove poll responses provided by employees who are at work. For example, the user may wish to identify areas and/or POIs having a high density, a density within a particular range, or a density that satisfies one or more threshold requirements of customers that are associated with a particular language and, therefore, the poll responses provided by responding user apparatuses associated with employees should be removed from the plurality of poll responses. The plurality of poll responses will then represent the presence of customers at various areas and/or POIs. For example, if a responding user apparatus is located within 20 feet or ten meters of the current location of the responding user apparatus for two hours or more, the responding user apparatus may correspond to an employee who is at work. For example, the first threshold distance may be five feet, ten feet, fifteen feet, twenty feet, thirty feet, fifty feet, five meters, ten meters, fifteen meters, twenty meters, and/or the like. For example, the first threshold amount of time may be an hour, two hours, three hours, four hours, and/or the like.

In an example embodiment, the first threshold distance and/or the first threshold amount of time are predetermined. In an example embodiment, the first threshold distance and/or the first threshold amount of time are area and/or POI type dependent.

At block 610, each of the plurality of poll responses is associated with an area and/or POI. For example, the network apparatus 10 may associate an area and/or POI with each of the plurality of poll responses. For example, the network apparatus 10 may comprise means, such as processor 12, memory 14, and/or the like, for associating an area and/or POI with each of the plurality of poll responses. For example, the network apparatus 10 may store (e.g., in memory 14) and/or access a geographic database and, based on map information/data of the geographic database, the network apparatus 10 may associate each poll response of the plurality of poll responses with an area and/or POI. For example, a map matching algorithm may be used to associate each poll response of the plurality responses with an area and/or POI, in an example embodiment. In an example embodiment, each area and/or POI of the geographic database may be associated with a geofence, a geolocated boundary, a point on a map and a radius about the point, and/or the like and poll responses providing a current location that is located within the geofence, geolocated boundary, radius about the point, and/or the like of an area and/or POI may be associated with the area and/or POI.

In an example embodiment, the plurality of poll responses are filtered after each of the poll responses have been associated with an area and/or POI (e.g., block 610 may be performed before performing block 608). For example, if the filter (e.g., first threshold distance and/or first threshold amount of time) is area and/or POI type dependent, the plurality of poll responses may be associated with areas and/or POIs prior to filtering such that filter may be applied to a poll response based on the area and/or POI type of an area and/or POI associated with the poll response.

At block 612, historical density area and/or POI information/data is accessed, in an example embodiment. For example, the network apparatus 10 may access historical density area and/or POI information. For example, the network apparatus 10 may comprise means, such as processor 12, memory 14, communication interface 16, and/or the like, for accessing historical density area and/or POI information/data. For example, the network apparatus 10 may store (e.g., in memory 14) a historical density database comprising historical density area and/or POI information/data. For example, the historical density area and/or POI information/data may comprise information/data identifying areas and/or POIs that have been previously identified as having a high density, a density within a particular range, or a density that satisfies one or more threshold requirements of user apparatuses associated with a particular language located thereat and identifying the particular language. In an example embodiment, the historical density area and/or POI information/data may indicate a date and/or time of day that an area and/or POI was identified as having a high density, a density within a particular range, or a density that satisfies one or more threshold requirements of user apparatuses associated with a particular language located thereat, an indication of what the determined density of user apparatuses associated with the particular language at the area and/or POI was, and/or the like. In an example embodiment, the historical density area and/or POI information/data may be used to predict areas and/or POIs that will be density areas and/or POIs in the future (e.g., at a particular time of the day, on a particular day of the week, for a particular event, and/or the like). In an example embodiment, the historical density area and/or POI information/data may be used to augment the plurality of poll responses indicating areas and/or POIs that are currently density areas and/or POIs.

At block 614, density areas and/or POIs are identified. In various embodiments, a density area and/or POI is an area and/or POI having a high density, a density within a particular range, or a density that satisfies one or more threshold requirements of individuals and/or (responding) user apparatuses that are associated with a particular language located thereat. In an example embodiment, the network apparatus 10 may identify and/or determine one or more density areas and/or POIs and a corresponding language for each of the one or more density areas and/or POIs. In an example embodiment, the network apparatus 10 may comprise means, such as processor 12, memory 14, and/or the like, for identifying and/or determining one or more density areas and/or POIs and a corresponding language for each of the one or more density areas and/or POIs. In an example embodiment, one or more density areas and/or POIs and the corresponding language(s) are identified and/or determined based on the plurality of poll responses and the associated areas and/or POIs. In an example embodiment, one or more density areas and the corresponding language(s) are identified and/or determined based on historical density area and/or POI information/data.

In an example embodiment, identifying and/or determining one or more density areas and/or POIs and the corresponding language(s) comprises determining one or more language associated with each poll response. In an example embodiment, a poll response provided by a responding user apparatus 20I includes one or more languages associated with the responding user apparatus 20I. In an example embodiment, one or more languages associated with the responding user apparatus 20I are determined by accessing a user profile corresponding to the responding user apparatus 20I (e.g. including an apparatus identifier that identifies the responding user apparatus 20I), extracting one or more languages from the accessed user profile, and associating the one or more extracted languages with the poll response.

In an example embodiment, identifying and/or determining one or more density areas and/or POIs and the corresponding language(s) comprises, for each area and/or POI associated with a minimum number of poll responses of the plurality of responses, determining the number of poll responses associated with the area and/or POI associated with each language. In an example embodiment, the minimum number of poll responses is a predetermined number (e.g., one, five, or ten); one, two, five, or ten percent of the number of the number of poll responses in the plurality of poll responses; and/or the like.

In an example embodiment, identifying and/or determining one or more density areas and/or POIs and the corresponding language(s) comprises, for each area and/or POI associated with a minimum number of poll responses of the plurality of responses, determining a language density for the area and/or POI. For example, in an example embodiment, the language density for a particular language at an area and/or POI may be determined as a ratio of the number of poll responses associated with the particular language and associated with the area and/or POI to the total number of poll responses in the plurality of poll responses. In an example embodiment, the language density for a particular language at an area and/or POI may be determined as a ratio of the number of poll responses associated with the particular language and associated with the area and/or POI to the total number of poll responses associated with area and/or POI. In an example embodiment, the language density for a particular language at an area and/or POI may be determined as a ratio of the number of poll responses associated with the particular language and associated with the area and/or POI to the number of poll responses associated with a dominant language and associated with the area and/or POI. In various embodiments, the density areas and/or POIs are identified in relation to a dominant language of the geographic region. In an example embodiment, the dominant language of the geographic region may be determined based on geopolitical information/data corresponding to the geographic region (e.g., if the geographic region is located within the United States of America, the dominant language may be taken as English). In an example embodiment, the dominant language may the most common language associated with the responding user apparatuses 20A, ..., 20N located within the geographic region. In various embodiments, the density areas and/or POIs are identified in relation to the total number of responding user apparatuses 20A, ..., 20N located within the geographic region. Various other techniques may be used to determine a language density for each area and/or POI having at least a minimum number of poll responses associated therewith for a particular language.

In an example embodiment, identifying and/or determining one or more density areas and/or POIs and the corresponding language(s) comprises, for each area and/or POI associated with a minimum number of poll responses of the plurality of responses, determining if the determined language density for a particular language qualifies as a high density, a density within a particular range, or a density that satisfies one or more threshold requirements. In various embodiments, a threshold requirement may be used to determine if a language density of an area and/or POI qualifies as the area and/or POI as a density area and/or POI. In an example embodiment, the threshold requirement is predetermined. In an example embodiment, the user may provide input selecting one or more threshold requirements and an indication of the one or more user-selected threshold requirements is stored in a user profile corresponding to the user and/or the requesting user apparatus 20'. For example, it may be determined that if at least 25%, 30%, 40%, 50%, and/or the like of the poll responses associated with an area and/or POI are associated with a particular language, then the area and/or POI has a density of responding user apparatuses located thereat that are associated with the particular language that qualifies the area and/or POI as a density area and/or POI. In an example embodiment, the threshold requirement is determined based on the determined language densities. For example, a statistical distribution (e.g., a Chi squared distribution) of language densities for each particular language and/or for all languages may be determined and the threshold requirement may be determined based on a predetermined value of the statistical distribution (e.g., a predetermined value of variance, a predetermined number of standard distributions, and/or the like). When a language density for a particular language and an area and/or POI is determined to satisfy the threshold requirement, the area and/or POI is identified as and/or determined to be a density area and/or POI associated with the particular language. When a language density for a particular language and an area and/or POI is determined to not satisfy the threshold requirement, the area and/or POI is determined to not be a density area and/or POI associated with the particular language. In an example embodiment, an area and/or POI may be a density area and/or POI for a first language but not a density area and/or POI for a second language. In an example embodiment, an area and/or POI may be a density area and/or POI for a first language and a density area and/or POI for a third language.

At block 616, a request response is generated and provided. For example, the network apparatus 10 may generate and provide a request response. For example, the network apparatus 10 may comprise means, such as processor 12, memory 14, communication interface 16, and/or the like, for generating and providing a request response. In an example embodiment, the request response comprises information/data regarding at least one area and/or POI identified as and/or determined to be a density area and/or POI. In an example embodiment, the request response comprises information/data regarding at least one area and/or POI identified as and/or determined to be a density area and/or POI that is (a) located within the geographical region indicated by the language request, (b) of an area and/or POI type indicated by the language request, (c) associated with a particular language indicated by the language request, and/or the like.

In various embodiments, the request response comprises information/data regarding at least one density area and/or POI identified based on the language request. For example, the request response may comprise information/data regarding at least one density area and/or POI (a) of the type of area and/or POI indicated in the language request, (b) located within the geographic region indicated in the language request, (c) associated with at least one language indicated in the language request, and/or the like. In various embodiments, the information/data regarding the at least one density area and/or POI may comprise a POI identifier. In various embodiments, the information/data regarding the at least one density area and/or POI may comprise a location (e.g., geolocation such as latitude and longitude, street address, and/or the like), a name, an area and/or POI type, contact information/data (e.g., a telephone number, email address, social media handle, link to a website, and/or the like), an associated language, one or more ratings (e.g., number of stars out of five, number of dollar signs indicating an expense level, and/or the like), one or more reviews, and/or the like. In various embodiments, the information/data regarding the at least one density area and/or POI may comprise a POI identifier. In an example embodiment where the requesting user apparatus 20' stores at least a portion of a geographic database (e.g., a digital map), the information/data regarding the at least one density area and/or POI may provide information/data (e.g., a POI identifier) required to identify a POI data record within the geographic database. In various embodiments, the information/data regarding the at least one density area and/or POI may comprise a language associated with the at least one density area and/or POI. In various embodiments, the information/data regarding the at least one density area and/or POI may only comprise the corresponding POI identifier and, optionally, an associated language, so as to reduce the bandwidth required to transmit the request response.

In various embodiments, the network apparatus 10 provides (e.g., transmits) the request response such that the requesting user apparatus 20' receives the request response. In various embodiments, the historical density area and/or POI information/data may be updated (e.g., by the network apparatus 10) based on the identified and/or determined density areas and/or POIs and the corresponding language(s). In an example embodiment, a network apparatus 10 may determine density areas and/or POIs on a periodic basis (e.g., every five minutes, every ten minutes, every fifteen minutes, every thirty minutes, every hour, every two hours, and/or the like) and, responsive to receiving a language request, the network apparatus 10 may generate a response request by filtering the most recent periodic determination of density areas and/POIs based on the language request (e.g., geographic area, one or more languages, area and/or POI type(s) and/or the like indicated by the language request) and the response request is determined based thereon.

In an example embodiment, a poll response from a first responding user apparatus 20A may indicate that the first individual associated with the first responding user apparatus 20A is willing to and/or interested in communicating with users based on one or more criteria (e.g., the first responding user apparatus 20A being located in a geographical region indicated by a language request provided based on user operation of the requesting user apparatus 20', the first responding user apparatus 20A being associated with a particular indicated by a language request provided based on user operation of the requesting user apparatus 20', the first responding user apparatus 20A being associated with an area and/or POI of an area and/or POI type indicated by a language request provided based on user operation of the requesting user apparatus 20', and/or other criteria). In such an embodiment, if the language request satisfies the one or more criteria, the request response may comprise information/data required for the requesting user apparatus 20' to initiate a communication with the first responding user apparatus 20A and/or for the requesting user apparatus 20' to request the network apparatus 10 facilitate initiating a communication between the requesting user apparatus 20' and the first responding user apparatus 20A.

Exemplary Operation of a Responding User Apparatus

In various embodiments, a plurality of responding user apparatuses 20A, . . . , 20N are polled so as to determine the location of user apparatuses associated with a particular language and/or various languages. For example, a responding user apparatus 20I may be configured to receive a poll request and, responsive thereto, determine a current location of the responding user apparatus 20I (e.g., using location sensor 29) and generate and provide a poll response comprising an indication of the determined current location. FIG. 7 provides a flowchart illustrating operations performed, such as by a responding user apparatus 20A, to generate and provide a response to a language request.

Starting at block 702, a poll request is received. For example, a responding user apparatus 20I may receive a poll request. For example, the responding user apparatus 20I may comprise means, such as processor 22, memory 24, communication interface 26, and/or the like, for receiving a poll request. For example, a network apparatus 10 may provide (e.g., transmit) a poll request such that the responding apparatus 20I receives the poll request. In various embodiments, the poll request comprises a request for a current location of the responding user apparatus 20I, a request for a length of time that the responding user apparatus 20I has been located within a first threshold distance of the current location of the responding user apparatus 20I, a request for one or more languages associated with the responding user apparatus 20I, and/or the like. In an example embodiment, the poll request may comprise an indication of a geographical region. In such an embodiment, the responding user apparatus 20I may not provide a poll response if the responding user apparatus 20I determines (e.g., via the location sensor 29) that the responding user apparatus 20I is located outside of the geographical region. In an example embodiment, the poll request may merely comprise that the responding user apparatus 20I should provide a poll response of a predetermined format such that the network apparatus 10 may receive the poll response.

At block 704, the current location of the responding user apparatus 20I is determined. For example, the responding user apparatus 20I may determine the current location of the responding user apparatus 20I. For example, the responding user apparatus 20I may comprise means, such as processor 22, memory 24, location sensor 29, and/or the like for determining the current location of the responding user apparatus 20I. For example, the responding user apparatus 20I may comprise a GNSS sensor/receiver and may use the GNSS sensor/receiver to determine the current location of the responding user apparatus 20I. In another example embodiment, various indoor positioning techniques may be used to determine the current location of the responding user apparatus 20I. For example, if the geographic region is a particular POI (e.g., a stadium, shopping mall, hospital, airport, courthouse, conference center, campus, and/or the like), various indoor positioning techniques may be used to determine a current location of the responding user apparatus 20I within the particular POI. In an example embodiment, the responding user apparatus 20I may determine an area and/or POI corresponding to the current location of the responding user apparatus 20I, for example, based on map information/data of a geographic database stored (e.g., in memory 24) by the responding user apparatus 20I. In an example embodiment, the responding user apparatus 20I may determine how long the responding user apparatus 20I has been located within a first threshold distance of the current location. For example, the responding user apparatus 20I may store a log of previous locations of the responding user apparatus 20I and, based on the log, determine a length of time that the responding user apparatus 20I has been located within a first threshold distance of the current location of the responding user apparatus 20I.

At block 706, a language associated with the responding user apparatus 20I is determined, in an example embodiment. For example, the responding user apparatus 20I may determine one or more languages associated with the responding user apparatus 20I. For example, the responding user apparatus 20I may comprise means, such as processor 22, memory 24, and/or the like, for determining one or more languages associated with the responding user apparatus 20I. In various embodiments, it may be determined if a responding user apparatus 20I is associated with a particular language based on a language setting on the responding user apparatus (e.g., a language setting for the operating system of the user apparatus), a language setting on one or more applications operating and/or stored at least in part on the responding user apparatus, and/or based on a user profile corresponding to the individual and associated with the responding user apparatus 20I and stored on the responding user apparatus 20I (e.g., in memory 24). For example, the processor 22 may access one or more language settings for the responding user apparatus 20I, one or more language settings for one or more applications operating and/or stored on the responding user apparatus 20I, and/or one or more user profiles stored on the responding user apparatus 20I to identify and/or determine one or more languages associated with the responding user apparatus 20I. In an example embodiment, the language associated with a responding user apparatus 20I is determined based on a user profile associated with the responding user apparatus 20I and stored by the network apparatus 10. In such an embodiment, the responding user apparatus 20I may not determine a language associated with the responding user apparatus 20I.

At block 708, a poll response is generated and provided. For example, a responding user apparatus 20I may generate and provide a poll response. For example, the responding user apparatus 20I may comprise means, such as processor 22, memory 24, communication interface 26, and/or the like, for generating and providing a poll response. In an example embodiment, a poll response provided by the responding user apparatus 20I comprises a current location of the responding user apparatus 20I, a length of time that the responding user apparatus 20I has been located within the first threshold distance of the current location of the responding user apparatus 20I, one or more languages associated with the responding user apparatus 20I, and/or the like. In an example embodiment, the poll response may comprise an area and/or POI corresponding to the current location of the responding user apparatus 20I. In various embodiments, the responding user apparatus 20I may provide the poll response such that the network apparatus 10 receives the poll response.

Technical Advantages

Various embodiments of the present invention provide methods, apparatuses, systems, computer program products, and/or the like for identifying and/or determining areas and/or POIs having a high density, a density within a particular range, or a density that satisfies one or more threshold requirements of individuals and/or corresponding user apparatuses associated with a particular language and/or various languages (e.g., density areas and/or POIs). Various embodiments of the present invention provide methods, apparatuses, systems, computer program products, and/or the like for providing an IUI for providing a user with information/data regarding at least one density area and/or POI. Various embodiments of the present invention provide methods, apparatuses, systems, computer program products, and/or the like for performing one or more navigation functions based on a user-selected density area and/or POI (e.g., determining a route to the user-selected density area and/or POI, estimating a travel time to the user-selected density area and/or POI, providing segment and/or lane level route guidance along a route to the user-selected density area and/or POI, control of an automated vehicle along a route to the user-selected density area and/or POI, and/or the like). Various embodiments provide methods, apparatuses, systems, computer program products, and/or the like for initiating and/or facilitating an anonymous communication between a requesting user apparatus and a first responding user apparatus based on a location and a language associated with the first responding user apparatus.

Various embodiments require communication between one or more user apparatuses (e.g., requesting user apparatus 20' and/or one or more user apparatuses 20A, . . . , 20N) via one or more networks 50. In various embodiments, at least one of the one or more networks 50 is a bandwidth limited network. Various embodiments provide for communications between the one or more user apparatuses to make efficient use of the bandwidth of network 50. For example, a request response may provide a POI identifier that may be used to identify a POI data record of a geographic database stored by the requesting user apparatus 20' rather than providing the POI data record and/or a portion thereof. In an example embodiment, the network apparatus 10 may provide poll requests such that the poll requests are only provided to responding user apparatus 20I that are associated with a particular language and/or that are located within a broadcast area that overlaps with the geographic region indicated by a language request. In an example embodiment, the network apparatus 10 may periodically poll a plurality of responding user apparatuses 20I so that the network apparatus 10 need not poll the plurality of responding user apparatuses 20I responsive to each individual location request.

Various embodiments provide further technical improvements by identifying areas and/or POIs having a density of individuals and/or corresponding user apparatuses that are associated with a particular language. By identifying areas and/or POIs having a density or concentration of individuals and/or corresponding user apparatuses that are associated with a particular language, various embodiments provide a more textured view of where individuals associated with a particular language are and/or frequent. Rather identifying areas and/or POIs having a number of individuals and/or corresponding user apparatuses associated with a particular language, various embodiments identify areas and/or POIs where the density and/or concentration of individuals and/or corresponding user apparatuses are associated with a particular language. Various embodiments provide an automated, technical implantation of the determination of the language density of an area and/or POI and the identification of areas and/or POIs with a high language density, a language density within a particular range, and/or a language density that satisfies one or more threshold requirements. For example, the poll responses and/or the poll responses associated with a particular language may be automatically fit to a statistical distribution such that the threshold requirement for identifying density areas and/or POIs may be tailored to each set of poll responses to prevent the identification of "false positive" density areas and/or POIs (e.g., identifying areas and/or POIs as density areas and/or POIs that have average language densities for the particular set of poll responses) or "false negatives" (e.g., determining that an area and/or POI is not a density area and/or POI, even if the language density of the area and/or POI is very high for the particular set of poll responses).

Various embodiments provide improvements to the functioning of a responding user apparatus 20'. For example, various embodiments perform one or more navigation functions corresponding to a user's current location (as determined by the location sensor 29 of the requesting user apparatus 20') or another user-specified origin and a user-selected density area and/or POI. For example, the responding user apparatus 20' may be configured to determine a route from the user's current location (as determined by the location sensor 29 of the requesting user apparatus 20') or another user-specified origin and a user-selected density area and/or POI, determine and provide an estimated travel time for the route, provide route guidance along the route, control a vehicle to travel along the route, and/or the like.

III. Example Apparatus

The network apparatus 10 and/or user apparatus 20 of an example embodiment may be embodied by or associated with a variety of computing devices including, for example, a navigation system including an in-vehicle navigation system, a vehicle control system, a personal navigation device (PND) or a portable navigation device, an advanced driver assistance system (ADAS), a global navigation satellite system (GNSS), a cellular telephone, a mobile phone, a personal digital assistant (PDA), a watch, a camera, a computer, and/or other device that can perform communication and/or location determination functions, such as determining the location of a user apparatus 20. Additionally or alternatively, the network apparatus 10 and/or user apparatus 20 may be embodied in other types of computing devices, such as a server, a personal computer, a computer workstation, a laptop computer, a plurality of networked computing devices, or the like. In an example embodiment, a user apparatus 20 is a mobile phone (e.g., cell phone, smart phone, and/or the like) or a wearable device (e.g., smart watch, head up display, and/or the like) and a network apparatus 10 is a server. In this regard, FIG. 2A depicts an example network apparatus 10 and FIG. 2B depicts an example user apparatus 20 that may be embodied by various computing devices including those identified above.

As shown, the network apparatus 10 of an example embodiment may include, may be associated with, or may otherwise be in communication with a processor 12 and a memory device 14 and optionally a communication interface 16 and/or a user interface 18. Similarly, the user apparatus 20 may comprise a processor 22, memory 24, a communications interface 26, a user interface 28, one or more location sensors 29 (e.g., a GNSS sensor; IMU sensors; RFID receiver/transceiver, and/or the like) and/or other components configured to perform various operations, procedures, functions or the like described herein. In various embodiments, the one or more location sensors 29 comprise an outdoor location sensor 29 (e.g., a GNSS sensor) and an indoor location sensor 29 (e.g., an RFID sensor/transceiver configured to determine an indoor position based on receiving signals form one or more RFID tags at known locations within an area and/or POI).

In some embodiments, the processor 12, 22 (and/or co-processors or any other processing circuitry assisting or otherwise associated with the processor) may be in communication with the memory device 14, 24 via a bus for passing information among components of the apparatus. The memory device may be non-transitory and may include, for example, one or more volatile and/or non-volatile memories. In other words, for example, the memory device may be an electronic storage device (e.g., a non-transitory computer readable storage medium) comprising gates configured to store data (e.g., bits) that may be retrievable by a machine (e.g., a computing device like the processor). The memory device may be configured to store information, data, content, applications, instructions, or the like for enabling the apparatus to carry out various functions in accordance with an example embodiment of the present invention. For example, the memory device could be configured to buffer input data for processing by the processor. Additionally or alternatively, the memory device could be configured to store instructions for execution by the processor.

As described above, the network apparatus 10 and/or user apparatus 20 may be embodied by a computing device and/or computing entity. However, in some embodiments, the apparatus may be embodied as a chip or chip set. In other words, the apparatus may comprise one or more physical packages (e.g., chips) including materials, components and/or wires on a structural assembly (e.g., a baseboard). The structural assembly may provide physical strength, conservation of size, and/or limitation of electrical interaction for component circuitry included thereon. The apparatus may therefore, in some cases, be configured to implement an embodiment of the present invention on a single chip or as a single "system on a chip." As such, in some cases, a chip or chipset may constitute means for performing one or more operations for providing the functionalities described herein.

The processor 12, 22 may be embodied in a number of different ways. For example, the processor 12, 22 may be embodied as one or more of various hardware processing means such as a coprocessor, a microprocessor, a controller, a digital signal processor (DSP), a processing element with or without an accompanying DSP, or various other processing circuitry including integrated circuits such as, for example, an ASIC (application specific integrated circuit), an FPGA (field programmable gate array), a microcontroller unit (MCU), a hardware accelerator, a special-purpose computer chip, or the like. As such, in some embodiments, the processor 12, 22 may include one or more processing cores configured to perform independently. A multi-core processor may enable multiprocessing within a single physical package. Additionally or alternatively, the processor 12, 22 may include one or more processors configured in tandem via the bus to enable independent execution of instructions, pipelining and/or multithreading.

In an example embodiment, the processor 12, 22 may be configured to execute instructions stored in the memory device 14, 24 or otherwise accessible to the processor. Alternatively or additionally, the processor 12, 22 may be configured to execute hard coded functionality. As such, whether configured by hardware or software methods, or by a combination thereof, the processor may represent an entity (e.g., physically embodied in circuitry) capable of performing operations according to an embodiment of the present invention while configured accordingly. Thus, for example, when the processor is embodied as an ASIC, FPGA or the like, the processor may be specifically configured hardware for conducting the operations described herein. Alternatively, as another example, when the processor is embodied as an executor of software instructions, the instructions may specifically configure the processor to perform the algorithms and/or operations described herein when the instructions are executed. However, in some cases, the processor may be a processor of a specific device (e.g., a pass-through display or a mobile terminal) configured to employ an embodiment of the present invention by further configuration of the processor by instructions for performing the algorithms and/or operations described herein. The processor may include, among other things, a clock, an arithmetic logic unit (ALU) and logic gates configured to support operation of the processor.

In some embodiments, the network apparatus 10 and/or user apparatus 20 may include a user interface 18, 28 that may, in turn, be in communication with the processor 12, 22 to provide output to the user, such as one or more instances of map information/data and/or graphical presentations thereof, information/data regarding one or more density areas and/or POIs, one or more routes through a road network (e.g., lane-level routes; e.g., from the current location of a user apparatus to the location of a density area and/or POI), and/or the output of one or more other navigation functions, and, in some embodiments, to receive an indication of a user input. As such, the user interface 18, 28 may include one or more output devices such as a display, speaker, and/or the like. In some embodiments, the user interface 18, 28 may include one or more input devices such as a keyboard, a mouse, a joystick, a touch screen, touch areas, soft keys, a microphone, and/or the like. In various embodiments, the user interface 18, 28 may comprise one or more other input/output mechanisms. Alternatively or additionally, the processor may comprise user interface circuitry configured to control at least some functions of one or more user interface elements such as a display and, in some embodiments, a speaker, ringer, microphone and/or the like. The processor and/or user interface circuitry comprising the processor may be configured to control one or more functions of one or more user interface elements through computer program instructions (e.g., software and/or firmware) stored on a memory accessible to the processor 12, 22 (e.g., memory device 14, 24 and/or the like).

The network apparatus 10 and/or user apparatus 20 may further include a communication interface 16, 26. The communication interface may be any means such as a device or circuitry embodied in either hardware or a combination of hardware and software that is configured to receive and/or transmit data from/to a network and/or any other device or module in communication with the apparatus. In this regard, the communication interface may include, for example, an antenna (or multiple antennas) and supporting hardware and/or software for enabling communications with a wireless communication network. Additionally or alternatively, the communication interface may include the circuitry for interacting with the antenna(s) to cause transmission of signals via the antenna(s) or to handle receipt of signals received via the antenna(s). In some environments, the communication interface may alternatively or also support wired communication. As such, for example, the communication interface may include a communication modem and/or other hardware/software for supporting communication via cable, digital subscriber line (DSL), universal serial bus (USB) or other mechanisms.

In addition to embodying the network apparatus 10 and/or user apparatus 20 of an example embodiment, a navigation system may also include or have access to a geographic database that includes a variety of data (e.g., map information/data) utilized in constructing a route or navigation path (e.g., a lane-level route), determining the time to traverse the route or navigation path, matching a geolocation (e.g., a GNSS determined location) to a point on a map, a lane of a lane network, and/or link, one or more localization features and a corresponding location of each localization feature, and/or the like. For example, a geographic database may include road segment or link data records, point of interest (POI) data records, localization feature data records, and other data records. More, fewer, or different data records can be provided. In one embodiment, the other data records include cartographic ("carto") data records, routing data, and maneuver data. One or more portions, components, areas, layers, features, text, and/or symbols of the POI or event data can be stored in, linked to, and/or associated with one or more of these data records. For example, one or more portions of the POI, event data, or recorded route information can be matched with respective map or geographic records via position or GNSS data associations (such as using known or future map matching or geo-coding techniques), for example. In an example embodiment, the data records may comprise nodes, connection information/data, intersection data records, link data records, travel lane data records, POI data records, and/or other data records. In an example embodiment, the network apparatus 10 may be configured to modify, update, and/or the like one or more data records of the geographic database. For example, the network apparatus 10 may modify, update, generate, and/or the like map information/data corresponding to links, lanes of a road segments, nodes, intersection, POIs, and/or the like and/or the corresponding data records, a localization layer (e.g., comprising localization features) and/or the corresponding data records, and/or the like. In an example embodiment, the network apparatus 10 may configured to access location-based and/or time-dependent obstacle information/data from an OLP environment.

In an example embodiment, the road segment data records are links or segments, e.g., maneuvers of a maneuver graph, representing roads, streets, travel lanes of roads and/or streets, or paths, as can be used in the calculated route or recorded route information for determination of one or more personalized routes (e.g., lane-level routes). The intersection data records are end points corresponding to the respective links or segments of the road segment data records. The road link data records and the intersection data records represent a road network, such as used by vehicles, cars, and/or other entities. Alternatively, the geographic database can contain path segment and intersection data records or nodes and connection information/data or other data that represent pedestrian paths or areas in addition to or instead of the vehicle road record data, for example. In an example embodiment, a geographic database may corresponding to a particular POI such as a stadium, shopping mall, airport, hospital, courthouse, conference center, campus, and/or the like and comprise information/data corresponding to areas within the particular POI, paths and/or the like for traveling between areas within the particular POI, and/or the like.

The road/link segments, travel lanes, intersections, and/or nodes can be associated with attributes, such as geographic coordinates, street names, address ranges, speed limits, turn restrictions at intersections, and other navigation related attributes, as well as POIs, such as gasoline stations, hotels, restaurants, museums, stadiums, offices, automobile dealerships, auto repair shops, buildings, stores, parks, etc. The geographic database can include information/data about the POIs and their respective locations in the POI data records. The geographic database can also include data about places, such as cities, towns, or other communities, and other geographic features, such as bodies of water, mountain ranges, etc. Such place or feature data can be part of the POI information/data or can be associated with POIs or POI data records (such as a data point used for displaying or representing a position of a city). In addition, the geographic database can include and/or be associated with event data (e.g., traffic incidents, constructions, scheduled events, unscheduled events, etc.) associated with the POI data records, or other records of the geographic database. In an example embodiment, a POI data record may comprise one or more POI types (e.g., restaurant, bar, hotel, gas station, library, park, and/or the like) corresponding to the POI. In an example embodiment, the POI types may be defined in a hierarchical manner. For example, a POI may be associated with the type restaurant and the sub-type Chinese restaurant.

The geographic database can be maintained by the content provider (e.g., a map developer) in association with the services platform. By way of example, the map developer can collect geographic data to generate and enhance the geographic database. There can be different ways used by the map developer to collect data. These ways can include obtaining data from other sources, such as municipalities or respective geographic authorities. In addition, the map developer can employ field personnel to travel by vehicle along roads throughout the geographic region to observe features and/or record information about them, for example. Also, remote sensing, such as aerial or satellite photography, can be used. In an example embodiment, the geographic database may be generated and/or updated based on map information/data generated and/or extracted from sensor information/data provided by user apparatuses 20 through the use of update and/or notification messages. In various embodiments, the user apparatuses 20 may be onboard vehicles owned and/or operated by and/or on behalf of members of the general public or onboard vehicles owned and/or operated as part of a private fleet.

The geographic database can be a master geographic database stored in a format that facilitates updating, maintenance, and development. For example, the master geographic database or data in the master geographic database can be in an Oracle spatial format or other spatial format, such as for development or production purposes. The Oracle spatial format or development/production database can be compiled into a delivery format, such as a geographic data files (GDF) format. The data in the production and/or delivery formats can be compiled or further compiled to form geographic database products or databases, which can be used in end user navigation devices or systems.

For example, geographic data is compiled (such as into a platform specification format (PSF) format) to organize and/or configure the data for performing navigation-related functions and/or services, such as route calculation, route guidance, map display, speed calculation, distance and travel time functions, and other functions. The navigation-related functions can correspond to vehicle navigation or other types of navigation. The compilation to produce the end user databases can be performed by a party or entity separate from the map developer. For example, a customer of the map developer, such as a navigation device developer or other end user device developer, can perform compilation on a received geographic database in a delivery format to produce one or more compiled navigation databases. Regardless of the manner in which the databases are compiled and maintained, a navigation system that embodies a network apparatus 10 and/or user apparatus 20 in accordance with an example embodiment may determine the time to traverse a route that includes one or more turns at respective intersections more accurately.

IV. Apparatus, Methods, and Computer Program Products

As described above, FIGS. 3, 6, and 7 illustrate flowcharts of a network apparatus 10 and/or user apparatus 20, methods, and computer program products according to an example embodiment of the invention. It will be understood that each block of the flowcharts, and combinations of blocks in the flowcharts, may be implemented by various means, such as hardware, firmware, processor, circuitry, and/or other devices associated with execution of software including one or more computer program instructions. For example, one or more of the procedures described above may be embodied by computer program instructions. In this regard, the computer program instructions which embody the procedures described above may be stored by the memory device 14, 24 of an apparatus employing an embodiment of the present invention and executed by the processor 12, 22 of the apparatus. As will be appreciated, any such computer program instructions may be loaded onto a computer or other programmable apparatus (e.g., hardware) to produce a machine, such that the resulting computer or other programmable apparatus implements the functions specified in the flowchart blocks. These computer program instructions may also be stored in a computer-readable memory that may direct a computer or other programmable apparatus to function in a particular manner, such that the instructions stored in the computer-readable memory produce an article of manufacture the execution of which implements the function specified in the flowchart blocks. The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowchart blocks.

Accordingly, blocks of the flowcharts support combinations of means for performing the specified functions and combinations of operations for performing the specified functions for performing the specified functions. It will also be understood that one or more blocks of the flowcharts, and combinations of blocks in the flowcharts, can be implemented by special purpose hardware-based computer systems which perform the specified functions, or combinations of special purpose hardware and computer instructions.

In some embodiments, certain ones of the operations above may be modified or further amplified. Furthermore, in some embodiments, additional optional operations may be included. Modifications, additions, simplifications, or amplifications to the operations above may be performed in any order and in any combination.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

That which is claimed:

1. A method comprising:
receiving a language request provided by a requesting user apparatus;
generating a poll request and providing the poll request to a plurality of responding user apparatuses;
receiving poll responses from at least a portion of the plurality of responding user apparatuses, each poll response indicating a current location of the corresponding responding user apparatus, wherein each responding user apparatus of the at least a portion of the plurality of responding user apparatuses is associated with a language;
based on the poll responses, identifying one or more density areas or points of interest (POIs), each density area and/or POI having a density of poll responses that (a) indicate a current location that corresponds to the area and/or POI and (b) is associated with a particular language;
generating a request response comprising information identifying at least one density area and/or POI of the one or more density areas and/or POIs;
providing the request response such that the requesting user apparatus receives the request response, wherein the requesting user apparatus is configured to, responsive to receiving the request response, provide information regarding the at least one density area and/or POI via an interactive user interface.

2. The method of claim 1, wherein the language associated with a responding user apparatus is determined based on at least one of (a) a language setting of the responding user apparatus, (b) a language setting of an application on the responding user apparatus or (c) a profile corresponding to the responding user apparatus.

3. The method of claim 1, further comprising filtering the poll responses to remove poll responses from responding user apparatuses that have been located within a threshold distance of the current location of the responding user apparatus for longer than a threshold amount of time.

4. The method of claim 1, further comprising accessing historical density area and/or POI data, wherein the one or more density areas and/or POIs are identified based at least in part on the historical density area and/or POI data.

5. The method of claim 1, wherein the language request indicates a geographic region and the at least one density area and/or POI is located within the geographic region.

6. The method of claim 1, wherein an area or POI is identified as a density area or POI associated with a first language when a ratio of (a) a number of poll responses indicating a current location corresponding to the area or POI and provided by responding user apparatuses associated with the first language to (b) (i) a number of poll responses indicating a current location corresponding to the area or POI or (ii) a number of poll responses indicating a current location corresponding to the area or POI and associated with a second language satisfies a threshold requirement.

7. The method of claim 6, wherein the threshold requirement is either (a) predetermined or (b) determined based on the poll responses.

8. The method of claim 1, wherein the interactive user interface is configured to allow a first user operating the requesting user apparatus to cause initiation of an anonymous communication with a first individual via a first responding user apparatus of the plurality of user apparatuses based on a language associated with the first responding user apparatus.

9. The method of claim 1, wherein the interactive user interface provides a list or a map indicating at the least one density area and/or POI.

10. The method of claim 9, wherein the list or map indicates the particular language corresponding to the at least one density area and/or POI.

11. The method of claim 1, wherein the poll request is generated either (a) responsive to receiving the language request or (b) on a periodic basis.

12. An apparatus comprising at least one processor, at least one non-transitory memory storing computer program code, and at least one communications interface configured to communicate via at least one network, the computer program code configured to, when executed by the at least one processor, cause the apparatus to at least:
receive a language request provided by a requesting user apparatus;
generate a poll request and providing the poll request to a plurality of responding user apparatuses;
receive poll responses from at least a portion of the plurality of responding user apparatuses, each poll response indicating a current location of the corresponding responding user apparatus, wherein each responding user apparatus of the at least a portion of the plurality of responding user apparatuses is associated with a language;
based on the poll responses, identify one or more density areas or points of interest (POIs), each density area and/or POI having a density of poll responses that (a) indicate a current location that corresponds to the area and/or POI and (b) is associated with a particular language;

generate a request response comprising information identifying at least one density area and/or POI of the one or more density areas and/or POIs;

provide the request response such that the requesting user apparatus receives the request response, wherein the requesting user apparatus is configured to, responsive to receiving the request response, provide information regarding the at least one density area and/or POI via an interactive user interface.

13. The apparatus of claim 12, wherein the language associated with a responding user apparatus is determined based on at least one of (a) a language setting of the responding user apparatus, (b) a language setting of an application on the responding user apparatus or (c) a profile corresponding to the responding user apparatus.

14. The apparatus of claim 12, wherein the computer program code is further configured to, when executed by the at least one processor, cause the apparatus to at least filter the poll responses to remove poll responses from responding user apparatuses that have been located within a threshold distance of the current location of the responding user apparatus for longer than a threshold amount of time.

15. The apparatus of claim 12, wherein the computer program code is further configured to, when executed by the at least one processor, cause the apparatus to at least access historical density area and/or POI data, wherein the one or more density areas and/or POIs are identified based at least in part on the historical density area and/or POI data.

16. The apparatus of claim 12, wherein the language request indicates a geographic region and the at least one density area and/or POI is located within the geographic region.

17. The apparatus of claim 12, wherein the interactive user interface is configured to allow a first user operating the requesting user apparatus to cause initiation of an anonymous communication with a first individual via a first responding user apparatus of the plurality of user apparatuses based on a language associated with the first responding user apparatus.

18. The apparatus of claim 12, wherein the interactive user interface provides a list or a map indicating at the least one density area and/or POI.

19. The apparatus of claim 18, wherein the list or map indicates the particular language corresponding to the at least one density area and/or POI.

20. An apparatus comprising at least one processor, at least one non-transitory memory storing computer program code, at least one communications interface configured to communicate via at least one network, and a user interface, the computer program code configured to, when executed by the at least one processor, cause the apparatus to at least:

provide an interactive user interface (IUI) via the user interface;

receive user input via the IUI initiating a language request;

generate and provide the language request such that a network apparatus receives the language request;

receive a request response generated by the network apparatus based on a polling of a plurality of user apparatuses, the request response comprising information identifying at least one density area and/or POI; and responsive to receiving the request response, provide, via the IUI, information regarding the density area and/or POI.

* * * * *